US012455486B2

(12) United States Patent
O'Keeffe et al.

(10) Patent No.: US 12,455,486 B2
(45) Date of Patent: Oct. 28, 2025

(54) ELECTROPHORETIC PARTICLE FILM HAVING REDUCED DIFFRACTION IN AN OPEN STATE

(71) Applicant: E INK CORPORATION, Billerica, MA (US)

(72) Inventors: Donal Martin O'Keeffe, Clare (IE); Brian D. Bean, Newton, MA (US)

(73) Assignee: E Ink Corporation, Billerica, MA (US)

( * ) Notice: Subject to any disclaimer, the term of this patent is extended or adjusted under 35 U.S.C. 154(b) by 522 days.

(21) Appl. No.: 17/953,386

(22) Filed: Sep. 27, 2022

(65) Prior Publication Data

US 2023/0100320 A1    Mar. 30, 2023

Related U.S. Application Data

(60) Provisional application No. 63/248,593, filed on Sep. 27, 2021.

(51) Int. Cl.
*G02F 1/167*     (2019.01)
*G02F 1/16755*   (2019.01)
*G02F 1/1676*    (2019.01)

(52) U.S. Cl.
CPC .......... *G02F 1/167* (2013.01); *G02F 1/16755* (2019.01); *G02F 1/1676* (2019.01)

(58) Field of Classification Search
None
See application file for complete search history.

(56) References Cited

U.S. PATENT DOCUMENTS

| | | | |
|---|---|---|---|
| 4,418,346 | A | 11/1983 | Batchelder |
| 5,872,552 | A | 2/1999 | Gordon, II et al. |
| 6,130,774 | A | 10/2000 | Albert et al. |
| 6,144,361 | A | 11/2000 | Gordon, II et al. |
| 6,172,798 | B1 | 1/2001 | Albert et al. |
| 6,184,856 | B1 | 2/2001 | Gordon, II et al. |
| 6,225,971 | B1 | 5/2001 | Gordon, II et al. |
| 6,271,823 | B1 | 8/2001 | Gordon, II et al. |
| 6,672,921 | B1 | 1/2004 | Liang et al. |
| 6,788,449 | B2 | 9/2004 | Liang et al. |

(Continued)

FOREIGN PATENT DOCUMENTS

| | | |
|---|---|---|
| EP | 1462847 A1 | 9/2004 |
| JP | 2008299202 A | 12/2008 |

(Continued)

OTHER PUBLICATIONS

Korean Intellectual Property Office, "International Search Report and Written Opinion", PCT/US2022/044795, Jan. 18, 2023. Jan. 18, 2023.

(Continued)

*Primary Examiner* — Ryan Crockett
(74) *Attorney, Agent, or Firm* — Brian D. Bean

(57) ABSTRACT

A switchable light modulating device with an electrophoretic medium disposed between a first light-transmissive electrode layer and a second electrode layer. The device includes one or more apodization structures in a bottom of a cell that contains the electrophoretic fluid, and the apodization structures reduce optical interference when the cell is in an open state and the structure is viewed with reflected or transmitted light passing through the apodization structure.

24 Claims, 10 Drawing Sheets

(56) References Cited

U.S. PATENT DOCUMENTS

| | | |
|---|---|---|
| 6,822,782 B2 | 11/2004 | Honeyman et al. |
| 6,866,760 B2 | 3/2005 | Paolini, Jr. et al. |
| 6,922,276 B2 | 7/2005 | Zhang et al. |
| 6,930,818 B1 | 8/2005 | Liang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,369,299 B2 | 5/2008 | Sakurai et al. |
| 7,411,719 B2 | 8/2008 | Paolini, Jr. et al. |
| 7,453,445 B2 | 11/2008 | Amundson |
| 7,495,819 B2 | 2/2009 | Sakurai et al. |
| 7,525,719 B2 | 4/2009 | Yakushiji et al. |
| 7,535,624 B2 | 5/2009 | Amundson et al. |
| 7,646,358 B2 | 1/2010 | Hattori et al. |
| 7,646,530 B2 | 1/2010 | Takagi et al. |
| 7,679,814 B2 | 3/2010 | Paolini, Jr. et al. |
| 7,715,088 B2 | 5/2010 | Liang et al. |
| 7,808,696 B2 | 10/2010 | Lee et al. |
| 7,839,564 B2 | 11/2010 | Whitesides et al. |
| 7,936,498 B2 | 5/2011 | Kanematsu et al. |
| 8,120,838 B2 | 2/2012 | Lin et al. |
| 8,159,741 B2 | 4/2012 | Lee et al. |
| 8,508,695 B2 | 8/2013 | O'Keeffe |
| 8,970,942 B2 | 3/2015 | Kwon et al. |
| 9,279,906 B2 | 3/2016 | Kang |
| 9,366,935 B2 | 6/2016 | Du et al. |
| 9,372,380 B2 | 6/2016 | Du et al. |
| 9,829,764 B2 | 11/2017 | Paolini, Jr. et al. |
| 10,067,398 B2 | 9/2018 | O'Keeffe |
| 10,444,553 B2 | 10/2019 | Laxton |
| 10,809,590 B2 | 10/2020 | Widger et al. |
| 10,983,410 B2 | 4/2021 | Widger et al. |
| 11,520,210 B2 | 12/2022 | O'Keeffe et al. |
| 11,846,838 B2 | 12/2023 | O'Keeffe |
| 2006/0087479 A1 | 4/2006 | Sakurai et al. |
| 2006/0087489 A1 | 4/2006 | Sakurai et al. |
| 2006/0137983 A1* | 6/2006 | Yano ................. B01D 57/02 204/601 |
| 2006/0209008 A1* | 9/2006 | Nihei ............... G02F 1/16756 345/107 |
| 2006/0214906 A1 | 9/2006 | Kobayashi et al. |
| 2008/0198443 A1* | 8/2008 | Yoshimura ............ G02F 1/167 264/238 |
| 2010/0188731 A1* | 7/2010 | Kanematsu ........... G02F 1/167 359/296 |
| 2014/0011913 A1 | 1/2014 | Du et al. |
| 2015/0005720 A1 | 1/2015 | Zang et al. |
| 2016/0012710 A1 | 1/2016 | Lu et al. |
| 2017/0315418 A1* | 11/2017 | Paolini, Jr. ......... G09G 3/2003 |
| 2021/0278712 A1* | 9/2021 | Tang ................ G02F 1/16757 |
| 2024/0219798 A1* | 7/2024 | Xia ...................... G02F 1/167 |

FOREIGN PATENT DOCUMENTS

| | | |
|---|---|---|
| JP | 2013152260 A | 8/2013 |
| WO | 2004079442 A1 | 9/2004 |

OTHER PUBLICATIONS

Auerbach, Jerome M. et al., "Serrated-aperture apodizers for high-energy laser systems," Applied Optics, vol. 33, Issue 15, pp. 3179-3183 (1994).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Wikipedia, "Babinet's Principle", 2002.

Wikipedia, "Gaussian blur", 2002.

European Patent Office, "Extended European Search Report", EP Appl. No. 22873725.0, Jun. 25, 2025.

* cited by examiner

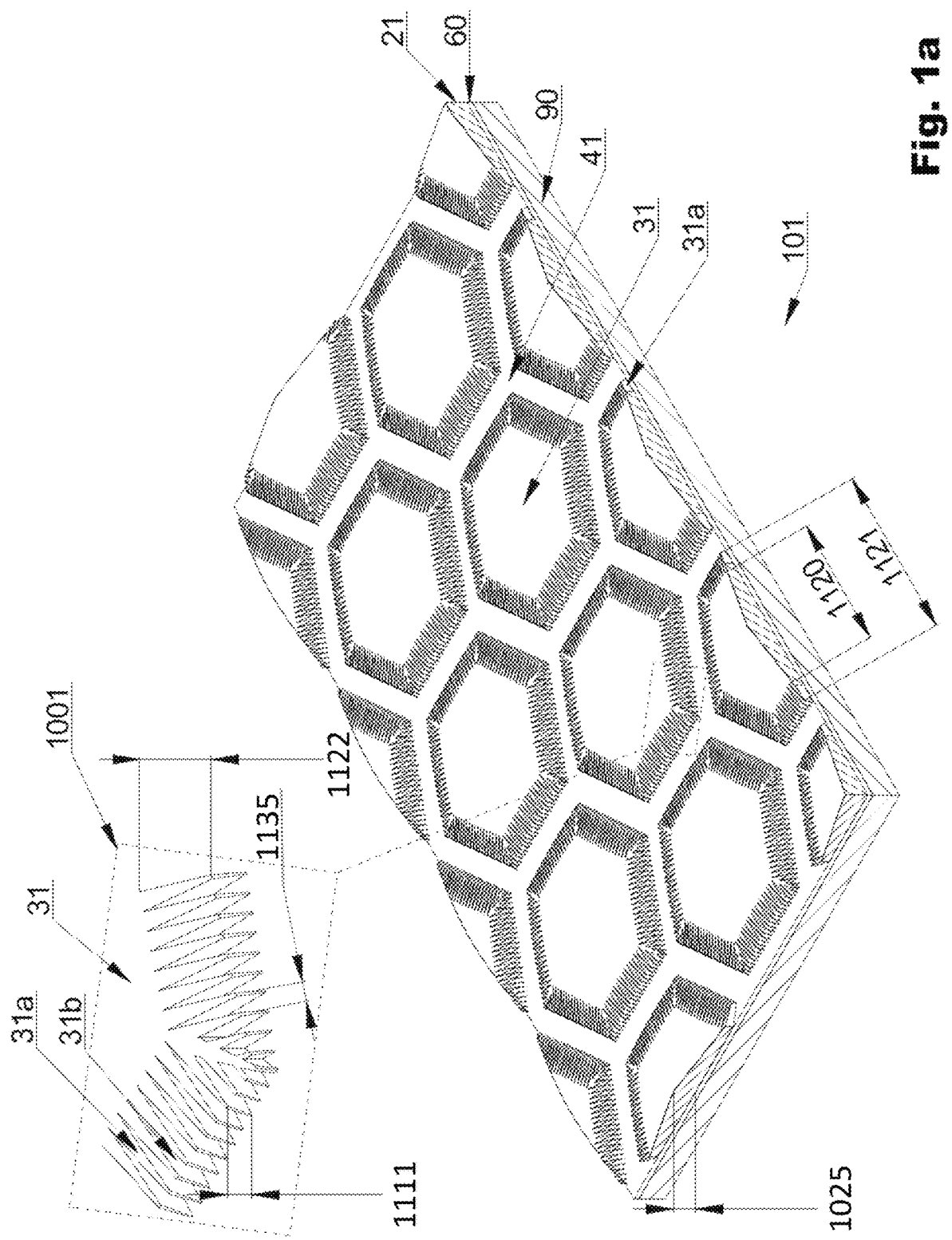

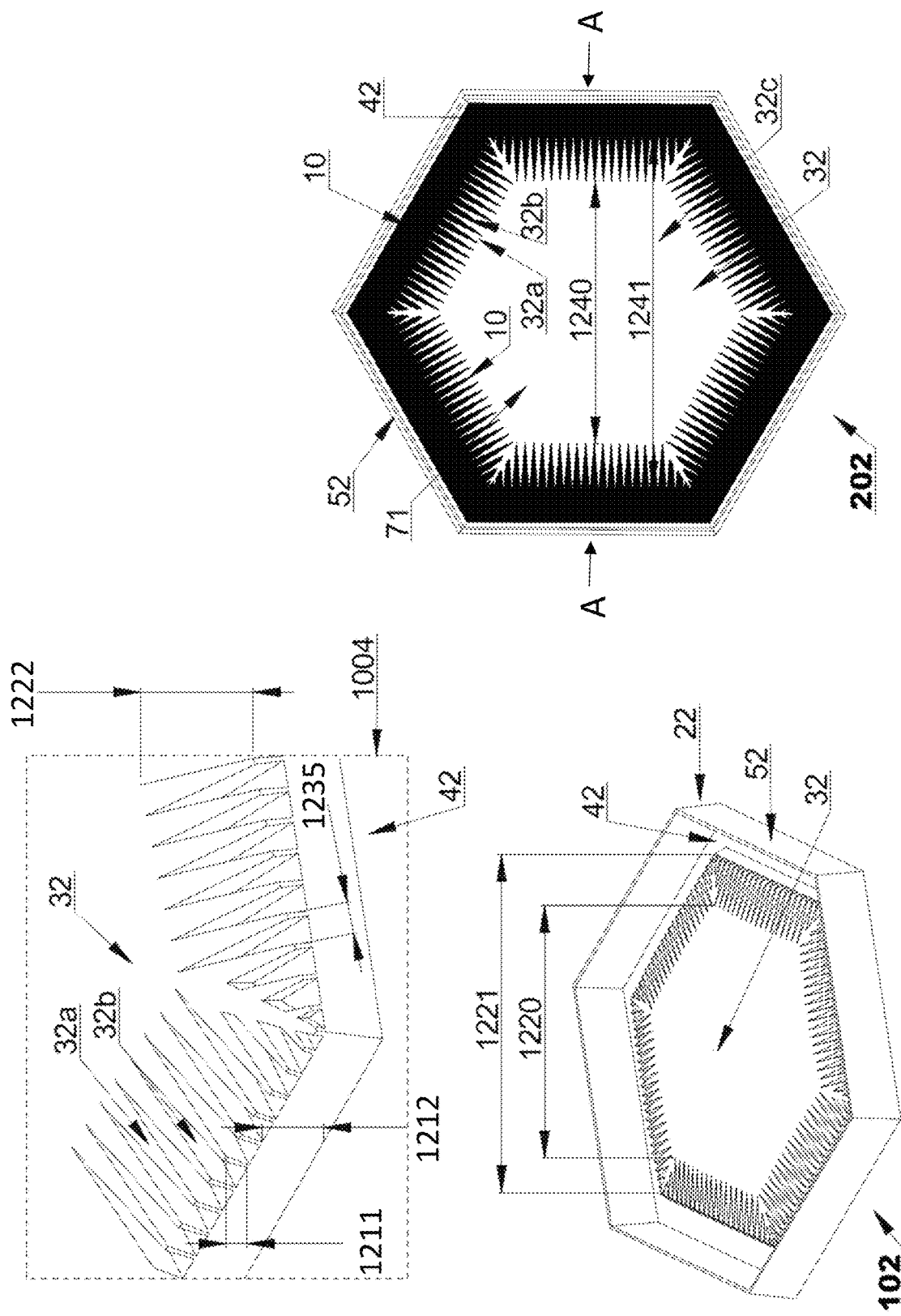

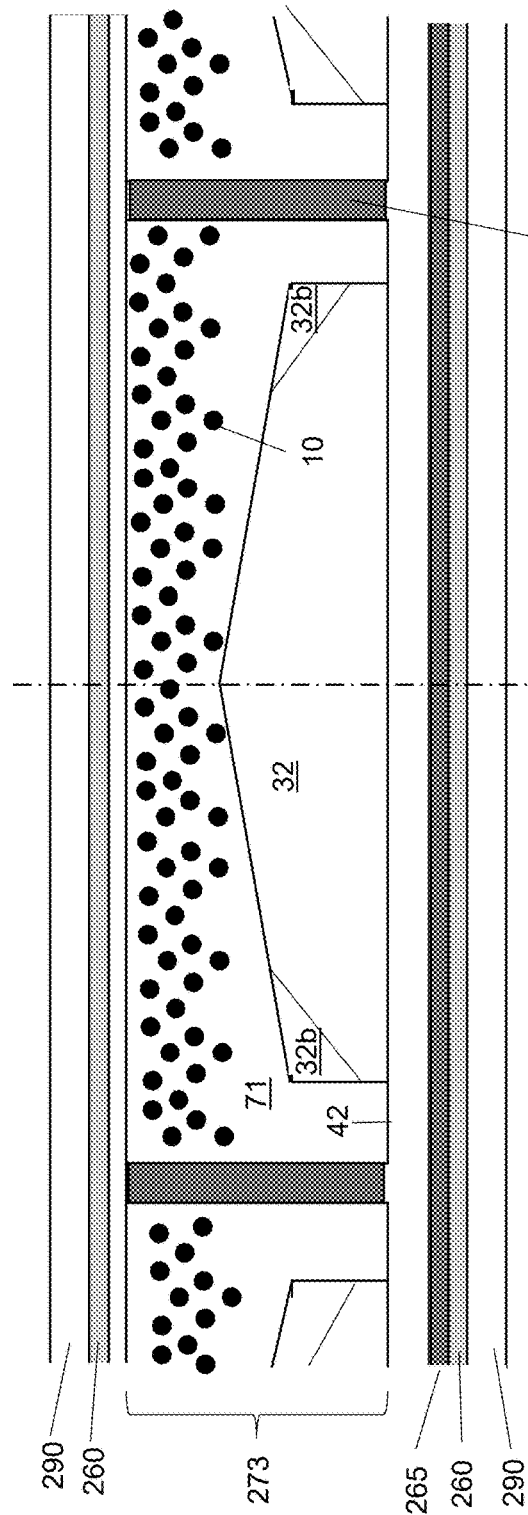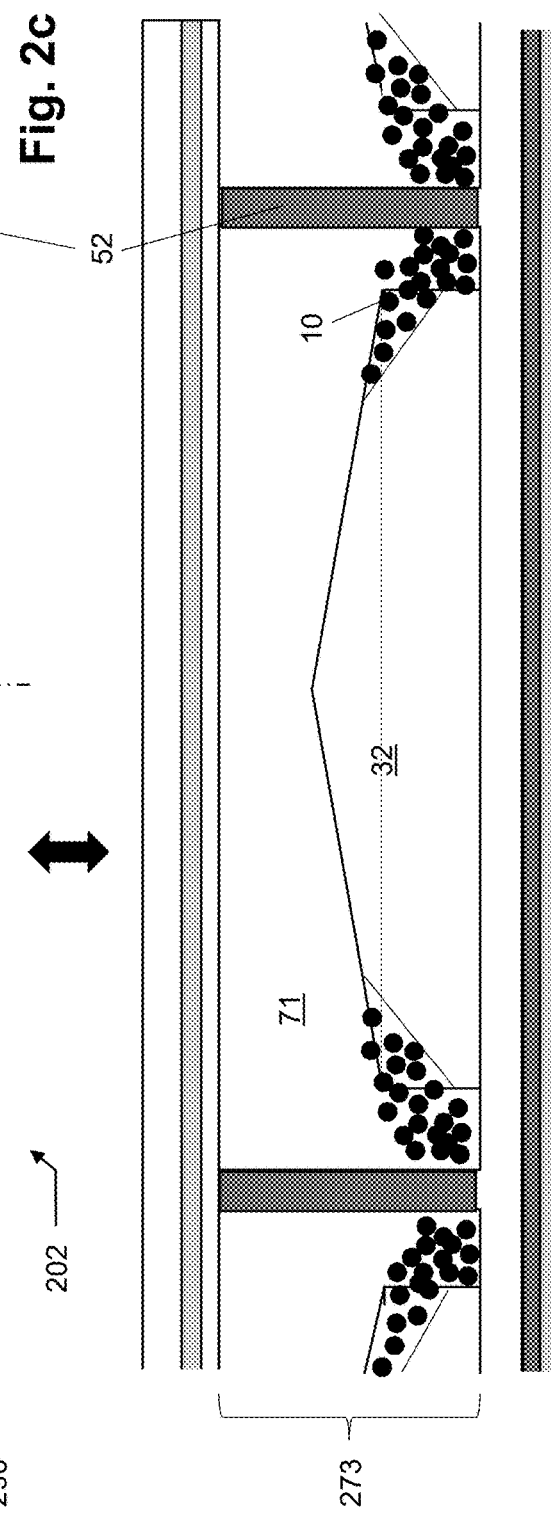

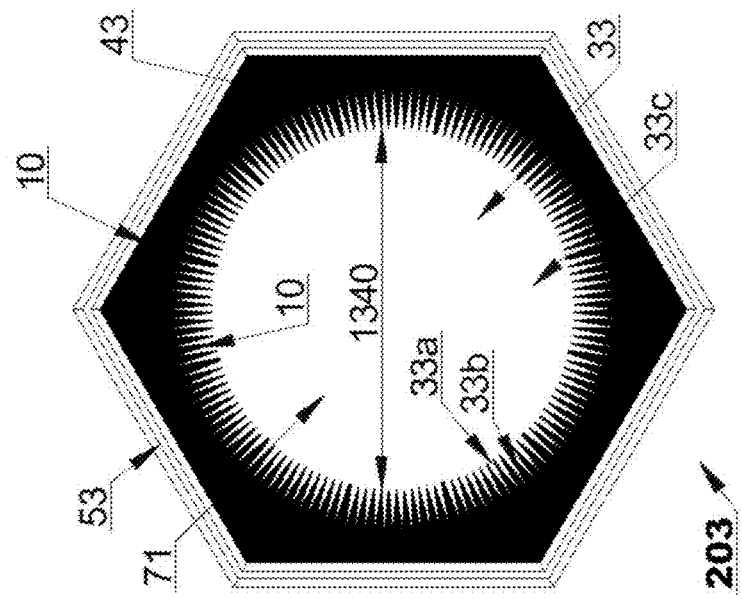
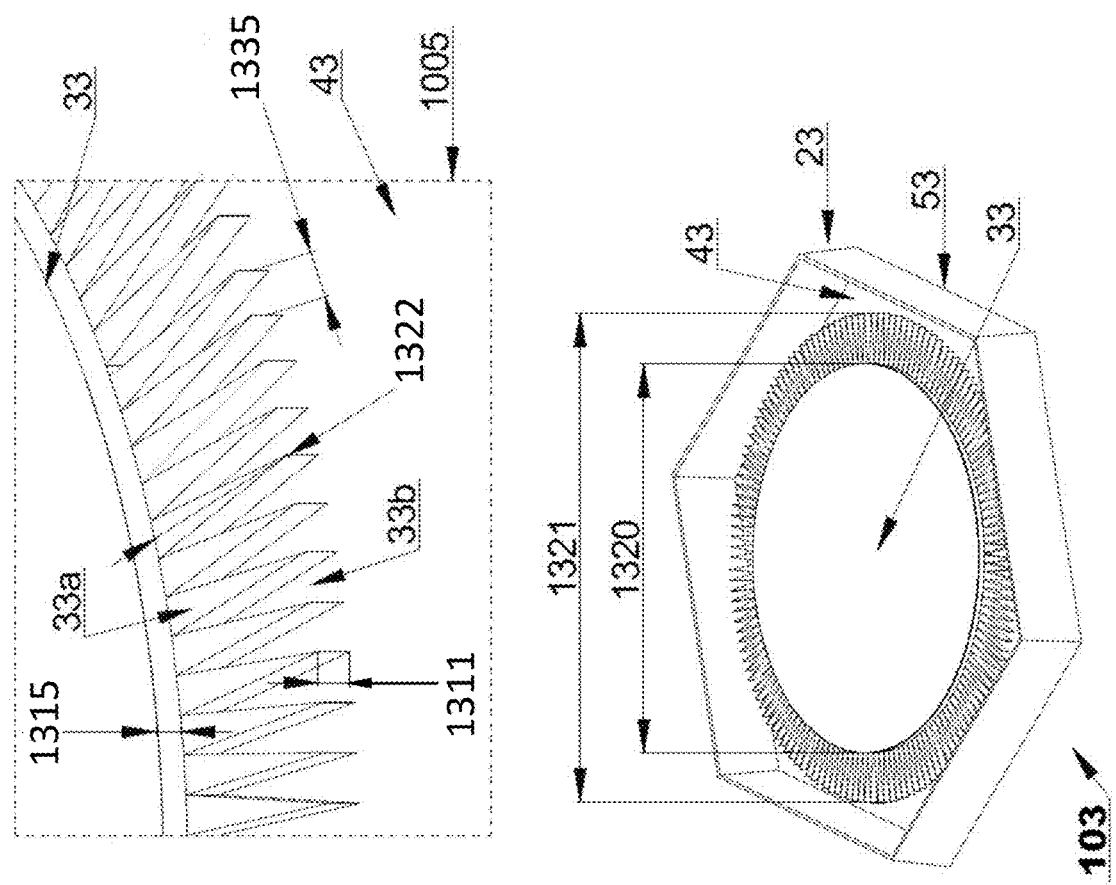
Fig. 3a
Fig. 3b

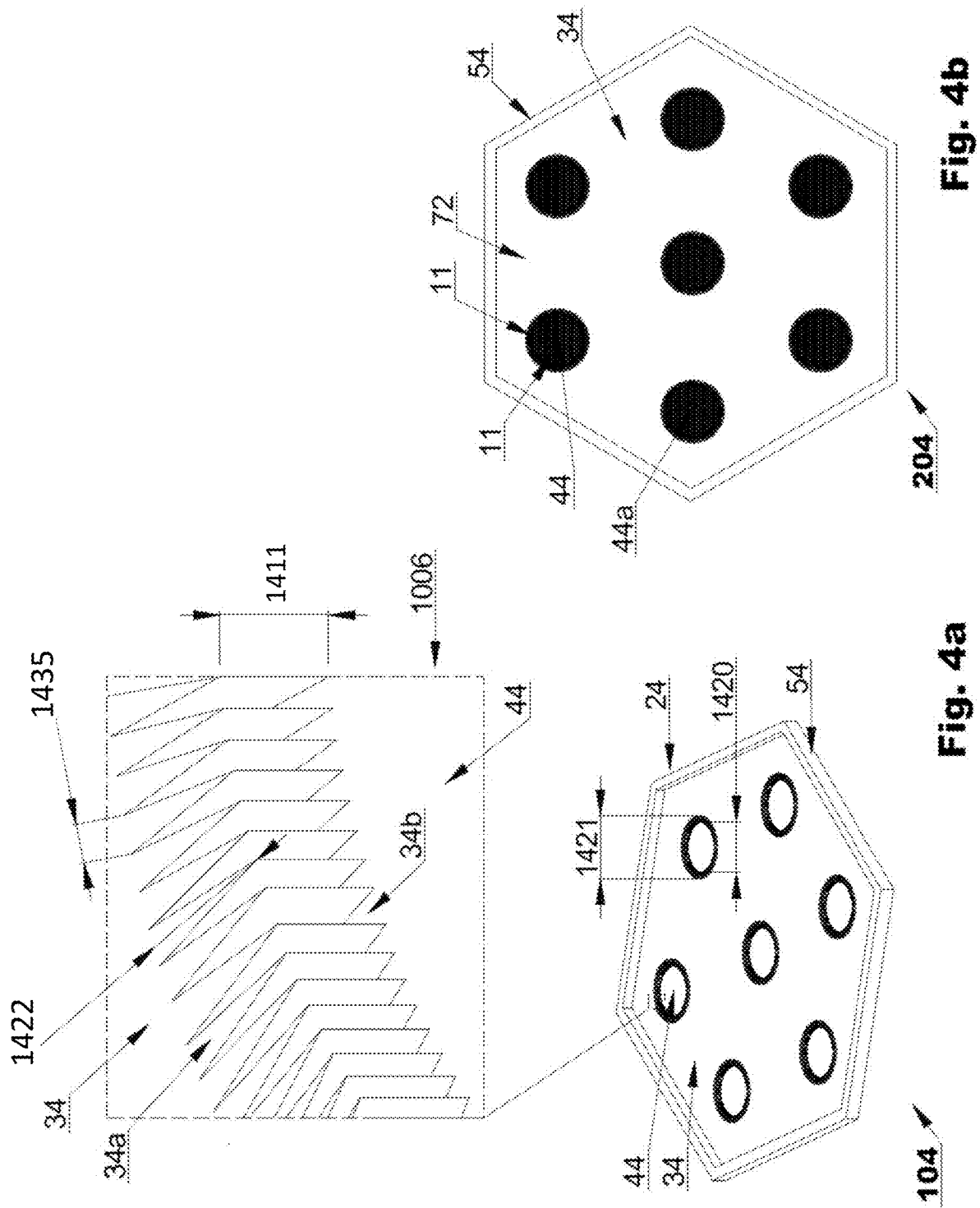

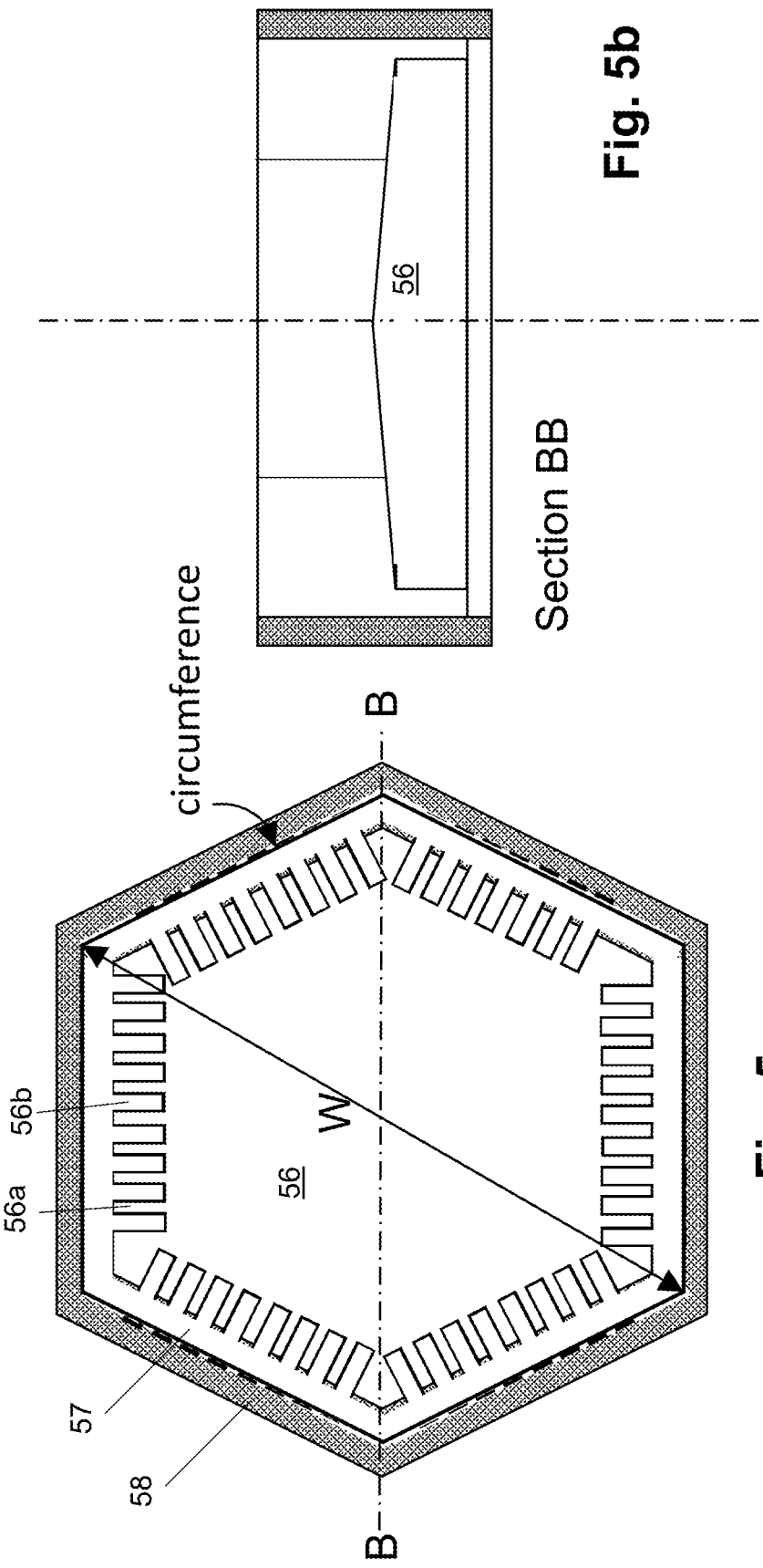

Section CC

Section DD

ELECTROPHORETIC PARTICLE FILM HAVING REDUCED DIFFRACTION IN AN OPEN STATE

RELATED APPLICATIONS

This application claims priority to U.S. Provisional Patent Application No. 63/248,593, filed Sep. 27, 2022. All patents and publications disclosed herein are incorporated by reference in their entireties.

FIELD OF THE INVENTION

The present invention relates to light modulating devices that are optically switchable and comprise a fluid or gel layer, and especially to devices that have flexible substrates. Such devices preferably have a polymer structure within the viewing area to maintain the gap between the substrates and to support handling in use including bending and laminating to glass or another substrate.

BACKGROUND

This invention relates to electrophoretic light modulating films, that is to say to films designed to modulate the amount of light or other electro-magnetic radiation passing through an electrophoretic medium. In some instances, the light will pass completely through the film (i.e., from top to bottom). In other instances, the light may pass through the electrophoretic medium, reflect/scatter off a surface and return through the medium a second time (i.e., from top to bottom surface and back to top.) Accordingly, such films may be incorporated into displays, signs, variable transmission windows, mirrors, displays and similar devices. Typically such films have an "open" state, in which one or more sets of pigment particles are isolated to the side or in wells, etc., so that most of the incident light can pass through the medium, and "closed" state in which one or more sets of pigment particles are distributed through the medium to absorb a portion of the incident light.

For example, in U.S. Pat. No. 10,067,398 an electrophoretic light attenuator comprises a cell including a first substrate, a second substrate spaced apart from the first substrate, a layer arranged between the substrates and containing an electrophoretic ink, and a monolayer of closely packed protrusions projecting into the electrophoretic ink and arranged adjacent a surface of the second substrate. The protrusions have surfaces defining a plurality of depressions between adjacent protrusions. The electrophoretic medium layer (ink layer) includes charged particles of at least one type, the particles being responsive to an electric field applied to the cell to move between a first extreme light state, in which the particles are maximally spread within the cell so as to lie in the path of light through the cell and thus strongly attenuate light transmitted from one substrate to the opposite substrate, and a second extreme light state, in which the particles are maximally concentrated within the depressions so as to let light be transmitted. The total area corresponding to the concentrated particles in the depressions is a fraction of the total face area.

Devices of this type rely at least in part on the shape of their non-planar, polymer structure to concentrate absorbing charged particles (e.g., black particles) in an electrophoretic ink in a transparent light state thereby forming (or exposing) light apertures (i.e. transmitting areas) and light obstructions (i.e. strongly absorbing areas), whose circumferences diffract light.

For convenience, the term "light" will normally be used herein, but this term should be understood in a broad sense to include electro-magnetic radiation at non-visible wavelengths. For example, as the present invention may be applied to provide windows which can modulate infra-red radiation for controlling temperatures within buildings. More specifically, this invention relates to light modulators which use particle-based electrophoretic media to control light modulation. Examples of electrophoretic media that may be incorporated into various embodiments of the present invention include, for example, the electrophoretic media described in U.S. Pat. No. 10,809,590 and U.S. Patent Publication No. 2018/0366069, the contents of both of which are incorporated by reference herein in their entireties.

In the prior art, solutions that have polymer structure in the fluid or gel layer, and suitable for use with the invention include U.S. Pat. No. 8,508,695 to Vlyte Innovations Ltd., which discloses dispersing fluid droplets (1 to 5 microns in diameter) in a continuous polymer matrix that is cured in place to both substrates, to contain liquid crystals. Additionally, U.S. Pat. No. 10,809,590 to E Ink Corporation discloses microencapsulating fluid droplets and deforming them to form a monolayer of close packed polymer shells in a polymer matrix on one substrate and subsequently applying an adhesive layer to bond the capsule layer to a substrate. Also EP1264210 to E Ink California discloses embossing a micro-cup structure on one substrate, filling the cups with fluid having polymerizable components and polymerizing the components to form a sealing layer on the fluid/cup surface, then applying an adhesive layer to bond to the second substrate. Additionally, EP2976676 to Vlyte Innovations Ltd. discloses forming a wall structure on one substrate, coating the tops of walls with adhesive, filling the cavities defined by the walls with fluid, and polymerizing the adhesive to bond the tops of walls to the opposing substrate. EP3281055 describes a flexible device including solid polymer microstructures embedded in its viewing area and the microstructures are on both substrates. The microstructures join (i.e. fasten) the substrates of the device to each other by engaging with each other over a length orthogonal to the substrates. The joined microstructures incorporate a wall structure that divides a device's fluid layer into a monolayer of discrete volumes contained within corresponding cavities. This provides the device with significant structural strength. In the method described, mating microstructures (i.e. male and female parts) are formed on each substrate, then precisely aligned with each other and joined in a press fit that also seals the fluid layer in the cavities.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. No. 7,012,600 and
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to SiPix Imaging, Inc.

Electrophoretic media are often opaque (since, for example, in many electrophoretic media, the particles substantially block transmission of visible light through the display) and operate in a reflective mode. However, electrophoretic devices can also be made to operate in a so-called "shutter mode," in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. In particular, when this "shutter mode" electrophoretic device is constructed on a transparent substrate, it is possible to regulate transmission of light through the device.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

There is a need for a solution that minimizes or avoids the perception of a diffraction pattern about a bright light source viewed through an electrophoretic device that uses a non-planar, polymer structure in forming an optically-transparent light state. In a diffraction pattern light and dark bands surround a bright light source greatly magnifying its apparent size. It becomes perceivable when light levels either side of a device are significantly different such as when viewing street lights, traffic lights, or the headlights of a car, at night time.

Diffraction as used herein refers to various phenomena arising from the wave nature of light and occurs in embodiments at the edge of light transmitting areas where light waves become obstructed (or absorbed) by black charged particles. The diffraction phenomenon can be described as the apparent bending of light waves around an obstruction (i.e. concentrated black charged particles) and the spreading out of light waves past small openings (i.e. apertures free of charged particles).

In devices that provide periodically spaced apertures or obstructions (e.g., devices having hexagonal-close-packing of protrusions) a complex diffraction pattern of varying intensity (i.e. light and dark bands) results about brightly lit objects viewed through the device. The complex pattern is due to the superposition, or interference, of different parts of a light wave that travels to a viewer by different paths and is similar to diffraction patterns formed by diffraction gratings having a similar shape of slit. When viewing an object through a device, the smaller the dimension of apertures (or obstructions) in the array, the wider the diffraction bands.

Many of the applications contemplated herein, such as variable light transmittance films for use in windows, are viewed from a distance of one meter or more and the diffraction pattern is generally known as Fraunhofer diffraction (i.e. far field conditions). If the object and viewing distances are less than one meter then the pattern (where present) can fulfil the conditions for Fresnel diffraction (i.e. near-field diffraction), see the relevant entries in www.wikipedia.org for example.

In US Patent Publication No. 2021/0072578, the perception of diffraction is reduced in an electrophoretic device by arranging its microstructures aperiodically. The aperiodic microstructures are in a monolayer. For example, the microstructures have differences in surface shape in at least one aspect including centre-to-centre distance, cross-sectional area, cross-sectional geometric form, or orientation. Light is diffracted into a plurality of directions by the aperiodic microstructures, thereby reducing perceived diffraction patterns when an observer views a light source through the light attenuator. But diffraction is not suppressed, its perception is changed from being a characteristic diffraction pattern defined by the aperture or obstruction to a halo (i.e. randomized diffraction).

Typically, in such devices, a plurality of apertures (or obstructions) in the first light state, i.e., the open state, form an array (i.e. periodically spaced) across a viewing face. The presence of a hard transition edge creates a complex diffraction pattern of varying intensity (i.e. light and dark bands) when brightly lit objects are viewed through the device. This can be unpleasant, even startling, when a viewer is looking through the device at, for example, a traffic light. The complex pattern is due to the superposition, or interference, of different parts of a light wave that travels to a viewer by different paths. The relative intensity of the positions of the diffraction pattern/order/band about the central bright object decreases with increasing position. In a plot of intensity/irradiance versus distance from the center of a light source in the far field and seen through an array of apertures, the diffraction positions/orders are apparent as ripples. In a Point Spread Function (PSF) plot the diffraction pattern is shown as dark and bright regions (or differently coloured regions). For example, the PSF plot for circular apertures comprises a bright central disc known as the Airy disc with concentric dark and bright bands outside this area forming a diffraction pattern.

There is a need for an electrophoretic device that has less perception of diffraction, preferably by significantly suppressing the diffraction pattern, and the scale of the diffraction visible about bright lights (in the distance) viewed through the device.

SUMMARY

In embodiments, in the first light state (i.e. the clear state), transmitted visible light is optically filtered in a switchable apodization technique (or transformation). The first light state, corresponding to the maximal light transmission state, is apodized.

In a first aspect, an electrophoretic cell including a light transmissive substrate; a first, light-transmissive electrode layer adjacent the light transmissive substrate, a cell having walls and a bottom including a light transmissive apodization structure, the walls and bottom creating a volume, a second electrode layer, wherein the cell is disposed between the first, light-transmissive electrode layer and the second electrode layer, an electrophoretic medium including a solvent and a first set of charged pigment particles disposed in the volume of the cell, and a bottom substrate.

In some embodiments, the electrophoretic cell further comprising an optically clear adhesive layer. In some embodiments, the first set of charged pigment particles are black. In some embodiments, the bottom of the cell is light-transmissive. In some embodiments, the second electrode layer is light-transmissive. In some embodiments, the bottom substrate is light-transmissive. In some embodiments, the walls are substantially light absorbing. In some embodiments, the apodization structure comprises a plurality of serrations that define groves there between, and the groves define a plurality of capture volumes for the charged pigment particles. In some embodiments, the serrations and groves are tapered.

In some embodiments, a cell's protrusions or wells have serrated edges that have the appearance of saw teeth. In some embodiments, the apodization structure comprises a plurality of floor thicknesses that define different optical densities when the charged pigment particles are attracted to the first electrode layer. In some embodiments, the cell includes only one apodization structure and the apodization structure is adjacent the walls of the cell. In some embodiments the apodization structure is joined to the walls of the cell. In some embodiments, the apodization structure includes between from 20 and 500 protrusions. In some embodiments, the apodization structure includes between from 40 to 250 protrusions. In some embodiments, the apodization structure includes between from 55 to 180 serrations. In some embodiments the length of serrations (in a plane parallel to the substrates) is proportional to the width of the apodization structure (about protrusions or wells), and the length is between from ½ to 1/32 of the width. In some embodiments, the serration length is between from ¼ to 1/25 of the width of the apodization structure. In some embodiments, the serration length is between from ⅙ to 1/20 of the width of the apodization structure.

In some embodiments, the cell is between 5 μm and 5000 μm in height. In some embodiments, the bottom of the cell is peaked so that the distance between the bottom and the second light-transmissive electrode layer in the middle of the cell is smaller than the distance between the bottom and the first light-transmissive electrode layer at the edge between the wall and the bottom of the cell. Such electrophoretic cells may be incorporated into a light shutter, a light attenuator, a variable light transmittance sheet, a variable light absorptance sheet, a variable light reflectance sheet, a one-way mirror, a sunvisor., a skylight, a display, or a digital sign.

The embodiments (201, 202, 203, 204) comprise an electrophoretic ink layer (71, 72) held between first (101, 102, 103, 104) and second (141) substrates. In the embodiments the electrophoretic ink layer (71, 72) comprises particles (10, 11) dispersed in the suspending fluid (71, 72) of the electrophoretic ink. Embodiments have a non-planar polymer structure (21, 22, 23, 24) fixed to the first substrate (101, 102, 103, 104) and forming an interface with the electrophoretic ink (71, 72). The second substrate 141 forms the interface with the electrophoretic ink on the opposite side. The substrates include transparent electrodes 60 and transparent carrier film 90. The electrodes' major surfaces face each other and are juxtaposed parallel. The volume between the respective electrodes (60) is the electro-optical layer (121).

Within the electro-optical layer (121), the non-planar polymer structure (21, 22, 23, 24) has protrusions (31, 32, 33) or wells (44) that define optical apertures (31c, 32c, 33c) or obstructions (44a) respectively in the first light state by defining the extent of the volume occupied by concentrated particles (10, 11) in that state. In embodiments, the periphery of protrusions (31, 32, 33) or wells (44) are patterned with tapered grooves (31b, 32b, 33b, 34b), recesses, or stepped areas (to apodize the apertures or obstructions so formed).

In some embodiments (201, 202, 203, 204) these grooves form serrated edges or a serrated circumference and have the appearance of a sawtooth structure. The serrations (31b) are in the shape of teeth that abut and taper (in a face view) to a tip extremity. To be sure, serrations are just one way to define peripheral structures that create capture volumes for charged particles (10, 11). In embodiments, the capture volumes are arranged to apodize transmitted light. In the first light state, apodization changes an aperture's (or obstruction's) transmission profile resulting in non-uniform transmission.

In embodiment 203, light transmission varies linearly in the tapered serrated aperture edge area from a maximum at the inside tips of the serrations (indicated by dimension 1340) to a minimum at the outer edges of the serration area. Dimension 1340 relates to the aperture (33c) and its sawtooth peripheral structure formed by the concentrated particles (10). The aperture dimensions are defined by the protrusion dimensions 1320 and 1321 (shown in FIG. 3a).

In the peripheral area of apertures and/or obstructions, the average visible light transmission lies in the range from 75% to 25% of the transmission in the broad central (or unencumbered) area per unit of area, and preferably in the range 60% to 40%, and most preferably, 55% to 45%.

In some embodiments a variable transmission profile in the peripheral area of apertures (or obstructions) approximates a Gaussian transmission profile.

In embodiments the edge transitions that reduce diffraction (w.r.t. a hard edge) are formed on switching to the first light state and are absent in the second light state.

The number of serrations (in the protrusions or wells) is from 20 to 500, preferably from 40 to 250, and most preferably from 55 to 180.

In embodiment 201, the serration pitch (1135)=the protrusion (31) circumference (defined w.r.t. width 1121) divided by the number of serrations.

The serration length (1122)=width of the protrusion (i.e. outer dimension 1121) divided by n; the range for n is from 2 to 32, and preferably from 4 to 25, and most preferably from 6 to 20.

In some embodiments the charged particles (10) concentrate in serration groves only in the first light state (i.e. such embodiments lack an interstices area and protrusions abut each other or a wall structure).

In some embodiments instead of a linear tapering of the sawtooth structure, the serrations (e.g., 31a) have curvature; for example, some embodiments have convex or concave serrations, and others are described by a sine function, or a Gaussian function, and provide non-linear but continuous variation in light transmission. In yet other embodiments, the serrations have one or more steps such as truncated tips, and/or stepped sides (i.e. the profile of a stairs).

In yet other embodiments the light transmission gradient in the peripheral aperture area (or edge area) is created by concentrating particles (10) in micro pits (defined by microgrooves) and analogous to halftone print in appearance.

In still further embodiments, the peripheral area consists of one or more stepped borders (or annulus) and light transmission changes step wise between stepped areas. In this case the different steps are associated with a different depth of concentrated particles and so a different light transmission.

The tapered serrations (32a) define tapered grooves (32b). The grooves (32b) differ from FIG. 1a's grooves (31b) in that their depth (dimension 1211) is less than the height of the serrations (dimension 1212), whereas in FIG. 1a both are the same. The base of the groves (32b) is sloped in some embodiments.

In embodiment 202 in the first light state, the concentrated particles (10) fill the tapered grooves (32b) and the interstices area (42) between the protrusion serrations (32a) and the hexagonal cavity wall 52. The latter is preferably colored and matches the color of the charged particles.

In embodiment 202 (FIG. 2) the protrusion (32) is hexagonal and its tapered serrations (32a) and groves (32b) are arranged orthogonal to its sides. In embodiment 203 (FIG. 3) the protrusion (33) is circular and its tapered serrations (33a) and groves (33b) are arranged radially. In some embodiments, the serrations can be arranged obliquely (i.e. at an acute angle to the orthogonal or radial).

Some embodiments have periodic serrations, but in other embodiments, the serrations in an aperture (or an obstruction) have differences including one or more of:
different serration lengths in the same aperture;
different serration orientations in the same aperture (e.g. orthogonal serrations mixed with radial serrations in a polygonal aperture);
different serration pitches in the same aperture; and,
different shape of serrations in the same aperture.

In yet other embodiments, these serration differences are not within an aperture (or obstruction) but between apertures (or obstructions).

In embodiments, the maxima in a diffraction pattern in far-field viewing conditions will be less than half the corresponding non-apodized device for the 4th and higher order maxima shown by a PSF plot of intensity versus distance (or viewing angle). In more preferred embodiments, the suppression of diffraction in the higher order maxima (≥5th) is at least 3 fold and consequently their pattern is not perceivable when viewing a bright light through a device's face.

Embodiments of the device regulate sunlight transmission and/or visual access when incorporated into a window of a building, or a transparent panel of an automobile or public transport vehicle. Yet other embodiments include use as a light shutter, a light attenuator, a variable light transmittance sheet, a variable light absorptance sheet, a variable light reflectance sheet, a one-way mirror, a sunvisor, or, a skylight.

These and other aspects of the present invention will be apparent in view of the following description.

BRIEF DESCRIPTION OF THE DRAWINGS

Embodiments of the invention will now be described, by way of example, with reference to the accompanying three-dimensional drawings, in which:

FIG. 1a shows a cell bottom including apodization structures in an embodiment of the invention.

FIG. 2a shows an embossed polymer cavity that is a cell of an embodiment of the invention.

FIG. 2b shows a face view of the apodization structure of an embossed polymer cavity embodiment.

FIG. 2c shows an exemplary section view of the embossed polymer cavity embodiment of FIG. 2a in a "closed" state in which the charged pigment particles are dispersed through the cell and absorb light incident on the cell.

FIG. 2d shows section AA of FIG. 2b in an "open" state in which the charged pigment particles collect between the protrusions of the apodization structure.

FIG. 3a shows an alternative apodization structure of an embossed polymer cavity for a different embodiment.

FIG. 3b shows a face view of the embodiment of FIG. 3a in an "open" light state.

FIG. 4a shows an alternative structure of an embossed polymer cavity for a different embodiment. The embodiment of FIG. 4a includes multiple apodization structures, each apodization structure including a plurality of protrusions.

FIG. 4b shows a face view of FIG. 4a in an "open" light state.

FIG. 5a shows a face view of an alternative apodization structure that may be used with the invention.

FIG. 5b shows a side section view of an alternative apodization structure that may be used with the invention.

Figure 1B:
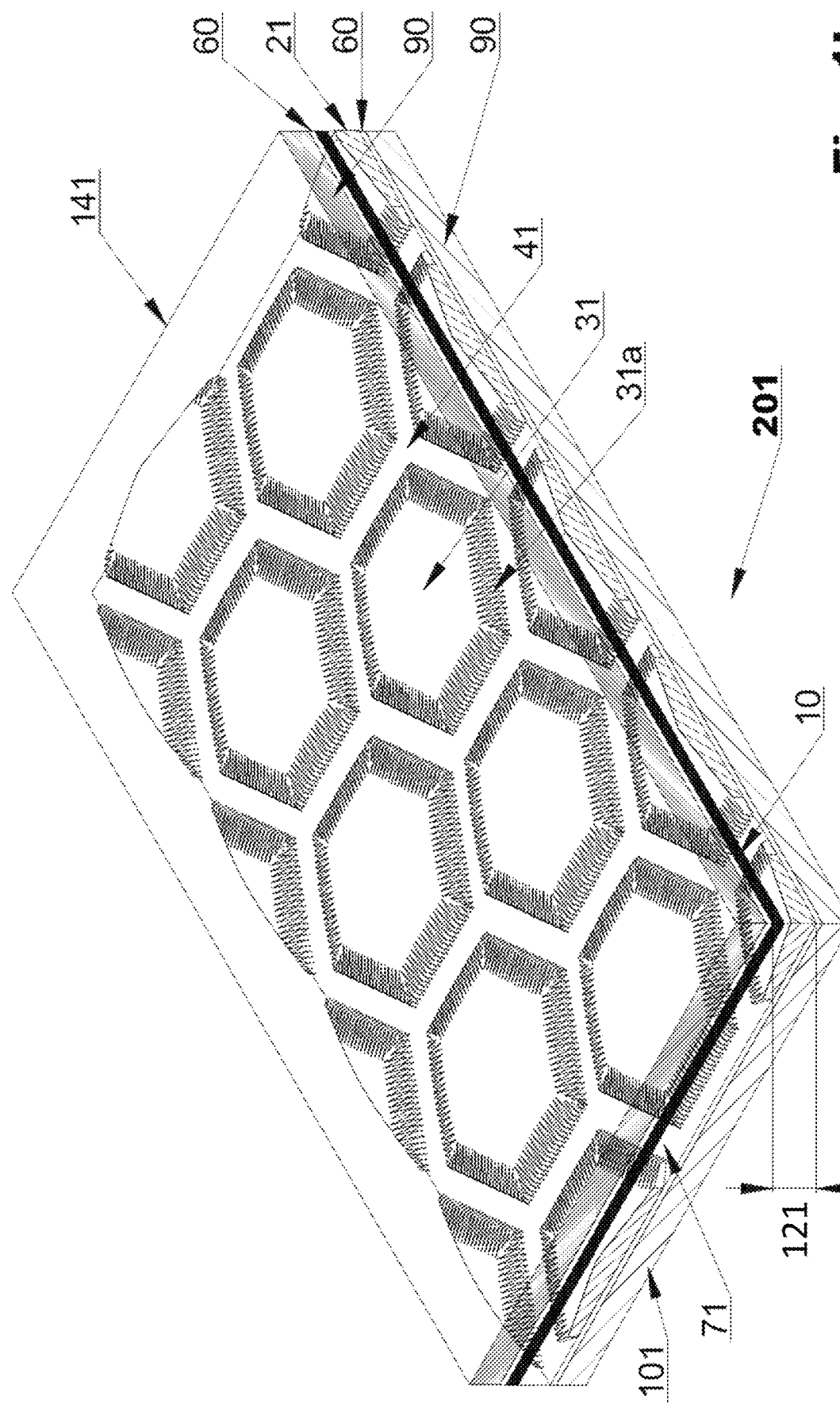
FIG. 1b shows a complete electrophoretic cell including a top light-transmissive electrode layer and a top light-transmissive substrate. The walls of the cell are removed for clarity.

The drawing depict one or more implementations in accord with the present concepts, by way of example only, not by way of limitations.

DETAILED DESCRIPTION

Embodiments of the present invention provide a switchable light modulating device with an electrophoretic fluid (electrophoretic medium) layer. The device includes one or more apodization structures in a bottom of a cell that contains the electrophoretic fluid, and the apodization structures reduce optical interference when viewing a scene through the device, or viewing a scene reflected by the device.

The apodization structures may be coupled to a substrate to create a bottom. The apodization structures may be embossed, or a material may be removed (e.g., with a cutting tool, laser ablation, etching, photolithography, etc.). The cells have walls providing a height (orthogonal to the juxtaposed major faces of the bottom) and width, which is typically on the order or micrometers, but can be larger, such as millimeters or greater. The invention may be incorporated into a light shutter, a light attenuator, a variable light transmittance sheet, a variable light absorptance sheet, a variable light reflectance sheet, a mirror, a sun visor for a vehicle, an electronic skin, a monochrome display, a colour display, a see-through display, a digital sign, an architectural accent, or a decorative film for a vehicle. Advantageously, embodiments are particularly suited to applications that require large areas such as from 0.25 $m^2$ to 5 $m^2$. The device can be produced in a roll-to-roll fashion and a roll of the resulting film can have an area of 1,000 $m^2$ or more.

In a preferred embodiment, electrophoretic cells are incorporated into light control devices wherein each of the substrates comprises respective first and second light-transmissive, e.g., transparent, electrodes defining an electrophoretic cell. The light modulator selectively modifies one or more of light transmission, light attenuation, color, specular transmittance, specular reflectance, or diffuse reflectance in response to electrical signals, and switches to provide two or more different light states. In embodiments, a first light state is transparent to visible light and corresponds to a maximum light transmission—a first extreme, i.e., "open" state, and a second light state corresponds to a minimum transmission—a second extreme, i.e., "closed" state. Of course, intermediate states are also possible, known as gray levels. Additionally, depending upon the pigment loading a "closed" state may not be completely opaque, and an "open" state may not be completely transparent. Additionally, if the device is configured for use as a mirror or display, the "open" state may be colored or reflective.

Between the substrates of an embodiment there is an electrophoretic medium (electrophoretic ink) layer adjacent the bottom of the cell (and substantially covering a face of the substrate). In some embodiments, the bottom includes a transparent, non-planar, polymer structure secured to the first substrate. The electrophoretic ink comprises coloured, charged particles in a suspending fluid and is in contact with the surface of the non-planar, polymer structure. The coloured, charged particles can be any colour including black or white. Preferably, the suspending fluid is transparent and refractive index matches the transparent, non-planar, polymer structure for at least one wavelength in the visible spectrum (typically 550 nm), and is a match or near match (i.e. within 0.01) for other visible light wavelengths. Consequently, in the absence of the coloured charged particles, visible light rays (for the matched wavelength) experience negligible refraction at the interface between the suspending fluid and the non-planar, polymer structure.

The charged pigment particles may be of a variety of colors and compositions. In some embodiments, all of the charged particles, regardless of charge polarity, may have the same or similar optical properties, such as color. In other embodiments, the first and second sets of oppositely charged particles may have different optical properties. In some embodiments, the first set of particles is colored (e.g., white, e.g., black) while the other set of particles is light-transmissive, and index-matched to meet the index of refraction of the internal phase of the electrophoretic medium. Additionally, the charged pigment particles may be functionalized with surface polymers to improve state stability. Such pigments are described in U.S. Pat. No. 9,921,451, which is incorporated by reference in its entirety. For example, if the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5) and of a certain size (>100 nm) to exhibit a white color, to be substantially light-transmissive, or composite particles engineered to have a desired index of refraction. Such particles may include, for example, poly(pentabromophenyl methacrylate), poly(-vinylnapthalene), poly(naphthyl methacrylate), poly(alphamethylstyrene), poly(N-benzyl methacrylamide) or poly(benzyl methacrylate). Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entireties.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA® 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly(ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state.

As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. In some embodiments, dispersants, such as polyisobutylene succinimide and/or sorbitan trioleate, and/or 2-hexyldecanoic acid are added.

The dispersion may contain one or more stabilizers. Stabilizers suitable for use in the dispersions made according to the various embodiments of the present invention include, but are not limited to, polyisobutylene and polystyrene. However, only a relatively low concentration of stabilizer may be necessary. A low concentration of stabilizer may assist in maintaining the media in the closed (opaque) or intermediate state, but the size of the heteroagglomerates of the oppositely charged particles in the open state would be effectively stable without the presence of a stabilizer. For example, the dispersions incorporated in the various embodiments of the present invention may contain, with increasing preference in the amounts listed, less than or equal to 10%, 9%, 8%, 7%, 6%, 5%, 4%, 3%, 2%, and 1% stabilizer based on the weight of the dispersion. In some embodiments, the dispersion may be free of stabilizer.

The fluids used in the variable transmission media of the present invention will typically be of low dielectric constant (preferably less than 10 and desirably less than 3). The fluids are preferably solvents that have low viscosity, relatively high refractive index, low cost, low reactivity, and low vapor pressure/ high boiling point. The fluids are preferably light transmissive and may or not have an optical property, such as color (e.g. red, green, blue, cyan, magenta, yellow, white, and black), that differs from the optical properties of at least one of the sets of charged particles of the dispersion. Examples of solvents include, but are not limited to, aliphatic hydrocarbons such as heptane, octane, and petroleum distillates such as Isopar® (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of the index matching agents. For example, the aforementioned U.S. Pat. No. 7,679,814 describes an electrophoretic medium suitable for use in a variable transmission device in which the fluid surrounding the electrophoretic particles comprises a mixture of a partially hydrogenated aromatic hydrocarbon and a terpene, a preferred mixture being d-limonene and a partially hydrogenated terphenyl, available commercially as Cargille® 5040 from Cargille-Sacher Laboratories, 55 Commerce Rd, Cedar Grove N.J. 07009. In the encapsulated media made according to various embodiments of the present invention, it is preferred that the refractive index of the encapsulated dispersion match as closely as possible to that of the encapsulating material to reduce haze. In most instances, it is beneficial to have an internal phase with an index of refraction between 1.51 and 1.57 at 550 nm, preferably about 1.54 at 550 nm. In embodiments using a light-transmissive particle that is index matched to the internal phase, the light-transmissive particle will also have an index of refraction between 1.51 and 1.57 at 550 nm, preferably about 1.54 at 550 nm.

In a preferred embodiment of the present invention, the encapsulated fluid may comprise one or more nonconjugated olefinic hydrocarbons, preferably cyclic hydrocarbons. Examples of nonconjugated olefinic hydrocarbons include, but are not limited to terpenes, such as limonene; phenyl cyclohexane; hexyl benzoate; cyclododecatriene; 1,5-dimethyl tetralin; partially hydrogenated terphenyl, such as Cargille® 5040; phenylmethylsiloxane oligomer; and combinations thereof. A most preferred composition for the encapsulated fluid according to an embodiment of the present invention comprises cyclododecatriene and a partially hydrogenated terphenyl.

In some embodiments of the invention, the amount of stabilizing agent included in the encapsulated fluid may be lower than is traditionally used in electrophoretic displays. See, for contrast, U.S. Pat. No. 7,170,670. Such stabilizing agents may be large molecular weight free polymers such as polyisobutylene, polystyrene, or poly(lauryl)methacrylate. Accordingly, in some embodiments, the encapsulated fluid (i.e., dispersion) further comprises less than 10% of a stabilizing agent by weight of the dispersion. In some embodiments, the dispersion is free of the stabilizing agent. It is found that by reducing the presence of large molecular-weight polymers, the haze is improved, making the final product more pleasing.

In the first light state of embodiments, the charged particles respond to an electrical field applied to the electrodes to concentrate in volumes defined by the transparent, non-planar, polymer structure. In so concentrating the charged particles form (or expose) features that diffract light. These features are a plurality of apertures (i.e. optical openings) through which light travels, or obstructions (i.e. optical stops) around which light travels. Light diffracts at the circumference of both, and according to 'Babinet's Principle', the diffraction pattern from an opaque body (i.e. obstruction) is identical to that from a transparent opening (i.e. aperture) of the same size and shape except for the overall forward beam intensity (see "Babinet's Principle" in www.wikipedia.org; last accessed Sep. 23, 2021). In the first light state of embodiments, the concentrated charged particles form the apertures and/or obstructions that diffract light but the transparent microstructures of the non-planar, polymer structure define them.

The light modulator of embodiments comprises a plurality of apertures or obstructions in a first light state, and the apertures or obstructions are apodized. Advantageously, this reduces (or minimizes, or suppresses the perception of) diffraction when compared to corresponding apertures that are not apodized. In embodiments, apodization changes an aperture's transmission profile resulting in non-uniform transmission. This non-uniform transmission has a maximum transmission in a broad, central, aperture area that reduces gradually (or in steps) as an aperture's edge is approached. In the peripheral area of apertures and/or obstructions defined by the apodization technique described herein, the average transmission lies in the range from 75% to 25% of the transmission in the broad central area per unit of area, and preferably in the range 60% to 40%, and most preferably, 55% to 45%.

In a first light state, an embodiment's apodized apertures and/or obstructions are arranged to reduce diffraction by virtue of the transparent microstructures providing (or arranging) a concentrated charged particle edge area (or peripheral area) that transitions gradually, or in one or more graded steps, from light transmitting to light obstructing for apertures, or the reverse for obstructions. In the first light state, an aperture's apodization feature, i.e., capture volumes, is implemented (and defined) by the interaction of concentrated particles with the non-planar structure (e.g., embossed polymer structure). The concentrated charged particles so arranged provide apertures with a variable transmission profile (especially adjacent an aperture's edge) that in some embodiments approximates a Gaussian transmission profile when regarded as light intensity as a function of distance from a center ray emanating from the face of the transition structure.

In embodiments, the concentrated particles so arranged filter incident visible light from a far-field scene (typically >10 m away) transforming its transmission profile from a flat-hat (or flat-top) irradiance beam to a non-uniform transmitted beam for a plurality of apertures (or obstructions) spread across the viewing face. In some embodiments the apertures (or obstructions) are close packed (or side-by-side) and arranged in a grid across a viewing face, in other embodiments they are arranged aperiodically, and in yet other embodiments they are arranged randomly. In some embodiments, an entire cell bottom is the aperture and a single apodization structure runs the periphery of the cell. In some embodiments, multiple cells are adjacent and may share common walls such as in a honeycomb structure. In some embodiments, the adjacent cells are irregular to decrease unwanted interference patterns in the transmitted light.

In embodiments where the device is intended to transmit light, the transparent microstructures of the non-planar, polymer structure are refractive index matched to the suspending fluid, and they do not diffract light significantly in the visible spectrum. In addition, the transparent microstructures (of the non-planar polymer structure) have a flat transmission profile in the visible spectrum in the aperture area. Similarly, in embodiments, the substrates and electrodes are transparent to visible light and in the area of the apodized apertures they have (or approximate) a flat transmission profile in the visible spectrum.

Apodization of apertures in embodiments is characterized by the absence of a transmission gradient patterned in a manufacturing step. By contrast, in embodiments, coloured charged particles in a suspending fluid (i.e. electrophoretic ink), transparent polymer microstructure, and an electrical field, combine in a first switchable light state to provide apertures with a transmission gradient (or variable transmission profile). This approach in embodiments also contrasts with prior art electrophoretic devices that transition abruptly from light transmitting to light obstructing; for example, see U.S. Pat. No. 10,067,398. In other words, apodized devices minimize diffraction by having a soft transition edge from light transmitting to light absorbing areas, whereas prior art devices have a hard edge between the light absorbing and light transmitting areas. In further alternative terms, embodiments minimize diffraction by blurring the transmission of apertures (or obstructions) at their periphery. In embodiments the edge transitions that reduce diffraction (with respect to a hard edge) are formed on switching to the first light state and are absent in the second light state.

Advantageously in the first (i.e. open) light state, the transmission gradient provided by apodization also reduces visual contrast between light transmitting and light blocking areas of the viewing face. A viewer's visual acuity relies on a sharp transition between bright and dark areas and this is absent in the apodized structure of embodiments. Consequently, the cavity (or cell) structure of a device (e.g., the grid structure of FIG. 1c) is less likely to be visible by eye, and where visible, appears blurred. An analogy can be made with the image processing technique known as "Gaussian Blur" where a visible pixel edge in an image is blurred by a software algorithm applying a Gaussian function to the edge area (for more information on the latter see the "Gaussian Blur" entry in www.wikipedia.org; last accessed Sep. 23, 2021).

In some embodiments the electrophoretic medium is bistable in that the medium can maintain a desired optical state without the application of an electric field. For example, when apodized apertures (or obstructions) of the first light state are bistable, power can be removed completely (i.e. zero volts between the first and second electrodes) after switching, and the apodized apertures remain unchanged. Similarly, the absence of apodized apertures in the second light state, e.g. a light-absorbing or "closed" state is stable after switching and removal of power.

Embodiments are described with reference to the three dimensional projection views shown in the figures. In the embodiments shown in the figures, particles (10, 11) are concentrated in the first light state to form a serrated edge due to the non-planar, polymer structure having correspondingly shaped grooves (31b, 32b, 33b, 34b) that form capture volumes to receive and define the concentrated particles.

Figure 1C:
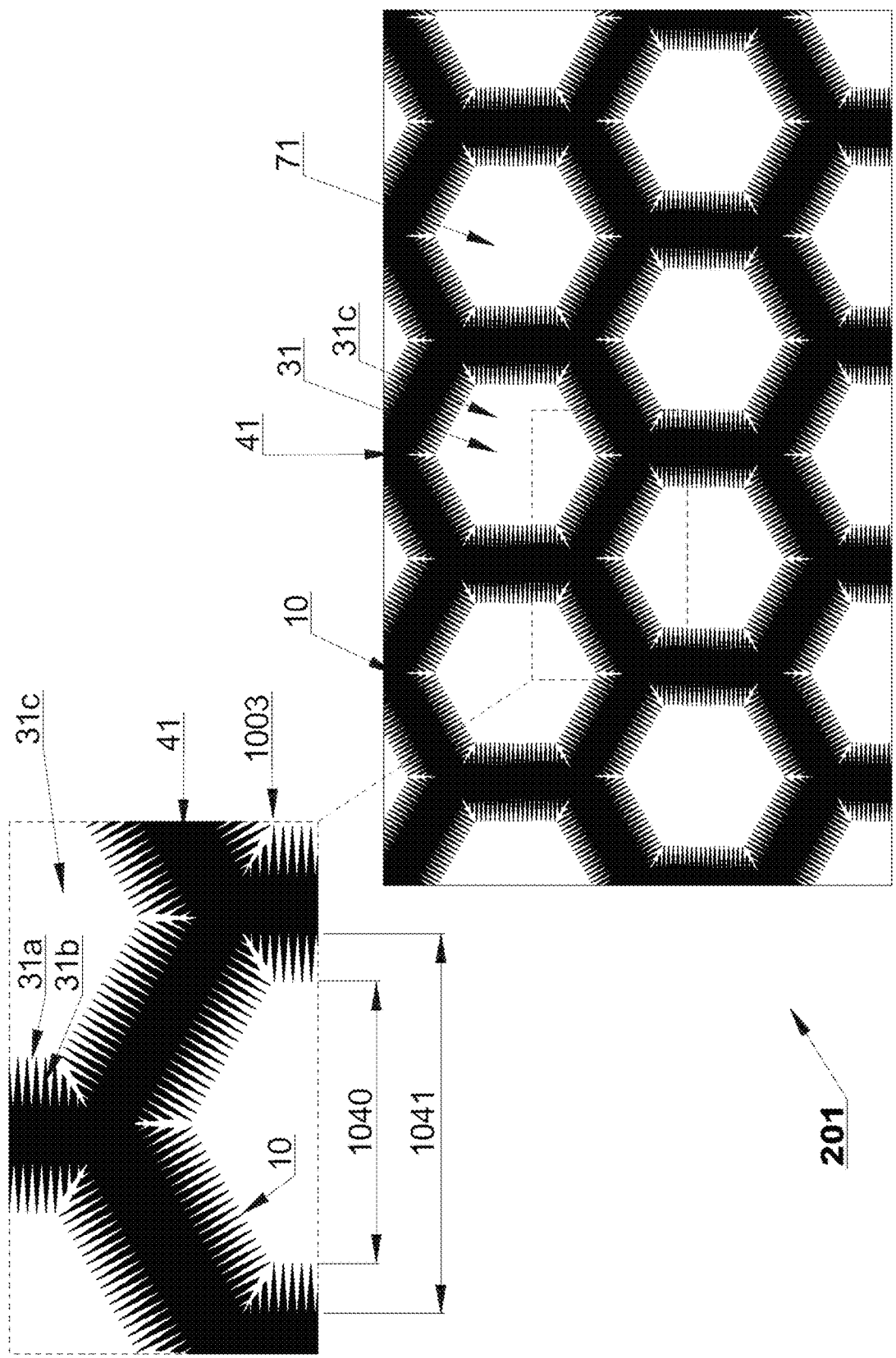
FIG. 1c shows a face view of an embodiment of the apodization structures from the bottom of a cell in an embodiment of the invention.

FIGS. 1a to 1c describe embodiment 201, FIGS. 2a and 2b describe embodiment 202, FIGS. 3a and 3b describe embodiment 203, and FIGS. 4a and 4b describe embodiment 204. The embodiments (201, 202, 203, 204) comprise an electrophoretic ink layer (71, 72) held between first (101, 102, 103, 104) and second (141) substrates. In the embodiments the electrophoretic ink layer (71, 72) comprises particles (10, 11) dispersed in the suspending fluid (71, 72) of the electrophoretic ink. Embodiments have a non-planar polymer structure (21, 22, 23, 24) fixed to the first substrate (101, 102, 103, 104) and forming an interface with the electrophoretic ink (71, 72). The second substrate 141 forms the interface with the electrophoretic ink on the opposite side. The substrates include transparent electrodes 60 and transparent carrier film 90. The electrodes' major surfaces face each other and are juxtaposed parallel. The volume between the respective electrodes (60) is the electro-optical layer (121).

Within the electro-optical layer (121), the non-planar polymer structure (21, 22, 23, 24) has protrusions (31, 32, 33) or wells (44) that define optical apertures (31c, 32c, 33c) or obstructions (44a) respectively in the first light state by defining the extent of the volume occupied by concentrated particles (10, 11) in that state. In embodiments, the periphery of protrusions (31, 32, 33) or wells (44) are patterned with grooves (31b, 32b, 33b, 34b), recesses, or stepped areas. In some embodiments (201, 202, 203, 204) these grooves form serrated edges or a serrated circumference and have the appearance of a sawtooth structure. The serrations (31b) are in the shape of teeth that abut and taper to a tip extremity. The inner surface of the serrations (31b) follows the slope of the protrusion 31 and the base of the serrations is level with the interstices area (41).

In FIGS. 1a, 1b, and 1c embodiment 201 is shown with just seven complete protrusions (31) and with sections cutting through adjacent protrusions and the fluid (71, 72). The section through fluid is not shown with hatched lines but the presence of fluid is generally indicated. In FIG. 1b the electro-optical layer 121 is not divided into cavities by wall structures, but in other embodiments, the electro-optical layer is divided into cavities. Regardless, the structure includes at least some walls to define a volume within which the electrophoretic fluid is held. In this regard, the following figures show just one of the numerous hexagonal cavities of their respective embodiments. The figures of embodiments correspond to a local area (or section) of a much larger device and the figures are not to scale. In embodiments the pitch of cavities (or cells) is from 50 microns to 5,000 microns. For example, a smart glass device with a cavity pitch of 250 microns would typically have between 2,000 and 6,000 protrusions and/or wells across its face, and from 2,000 to 20,000 along its face, or a total number in the array of between 4 million and 120 million.

FIG. 1a shows the first substrate 101 of embodiment 201. The substrate has a transparent flexible PET film 90 covered on its inner face with a transparent, flexible ITO electrode 60. Fixed to the inner face of electrode 60 is the non-planar polymer structure 21. The latter comprises protrusions 31. The space between protrusions (i.e. the interstices area) is indicated by 41. Protrusion 31 is a cone with its height indicated by dimension 1025. The cone is delimited by a hexagon and has a hexagonal base of height 1111 (included in dimension 1025). The latter is shown in the magnified view 1001 of a vertex area. The hexagonally delimited, cone protrusions 31 are in a hexagonal array.

Protrusions 31 have tapered serrations 31a and tapered grooves 31b between the serrations; these are shown in the magnified view 1001. The serrations and grooves are periodic with the pitch shown by dimension 1135. The length of a serration (or groove) orthogonal to a side (or flat) is shown by dimension 1122, and the serration (or groove) height, by dimension 1111. The flat-to-flat dimension of a protrusion 31 is shown by 1121, and the dimension between serrations on opposing sides, by dimension 1120. The latter is equal to dimension 1121 minus twice the serration length (i.e. 2× dimension 1122). The first substrate 101 is optically transparent. In some embodiments, the grooves are not tapered, but rather fall abruptly to the substrate below the non-planar polymer structure 21. Additionally, the protrusions can be a variety of shapes and sizes, resulting in a variety of groove shapes, i.e., capture volume shapes, as shown in FIGS. 5a, 5b, 6a, 6b, 7a, and 7b. Furthermore, the sides of serrations and walls are shown as being orthogonal to the bottom substrate in the figures, but in embossed implementations in embodiments, the sides are selected to have a draft angle to the vertical. In some embodiments, the serrations (being smaller) preferably have a larger draft angle than the cavity wall.

FIG. 1b shows embodiment 201 in the second light state, corresponding to the device's dark state, i.e., "closed" state. Particles 10 are spread across the viewing face and adjacent the inner face of the second substrate 141. The particles are not shown in FIG. 1b as black so as not to obscure the detail in the figure. However, the location of the particles in this closed state are roughly equivalent to FIG. 2c. In use, the second light state appears a dark, transparent black (assuming black particles 10), or a reflective black, or an opaque black.

The other substrate in embodiment 201 is 101 (see FIG. 1a). The volume between the inner opposing faces of the substrates' electrodes is the electro-optical layer 121. In the second light state, the ink's transparent suspending fluid 71 envelopes the inner face of the protrusions 31 and fills the grooves 31b. The ink's fluid and the protrusion's polymer are optically transparent and a refractive index match. This allows light incident on device 201, not otherwise absorbed by the black particles 10, to be transmitted unhindered (i.e. not refracted or diffracted) by the interface between the suspending fluid 71 and the protrusions 31. Consequently, in the second light state, light transmitted by the device is not apodized (i.e. not optically transformed by apodization).

FIG. 1c shows embodiment 201 in the first light state; this corresponds to the device's clear state or open state. The device is shown in a face view and a vertex area is magnified in view 1003. The solid black areas correspond to particles (10) concentrated in the interstices area (41—see FIGS. 1a and 1c) and the serration grooves (31b). The magnified view 1003 shows the concentrated particles (10) filling the grooves (31b) between the protrusion serrations (31a). In the face view, the concentrated black particles 10 enclose discrete aperture areas (31c) that transmit light. The latter are defined by protrusions (31). It is understood that in the case of individual apodized cells, the same face view would be present in the open state however the interstices area (41) would also include a cell wall, which is not shown directly in FIG. 1c, but is present as element 52 in FIG. 2a.

In the first light state the periphery of an aperture (31c) has a sawtooth shape formed by the concentration of particles (10) in the grooves 31b (between serrations 31a) of a protrusion (31). Light transmission varies linearly in the tapered serrated aperture edge area from a maximum at the inside tips of the serrations (indicated by dimension 1040) to a minimum at the outer edges of the serration area (indicated by dimension 1041). Dimensions 1040 and 1041 relate to the aperture (31c) and its sawtooth peripheral structure formed by the concentrated particles (10). The dimensions are defined by the protrusion dimensions 1020 and 1021 respectively (shown in FIG. 1a).

The first light state of embodiment 201 forms when a voltage having the opposite polarity to that of the charged particles (10) is applied to the electrode (60) of the first substrate (101) to form an electrical field between the opposing electrodes (60). The electrical field drives the charged particles (10) toward the inner face of the first substrate (101) and on encountering the protrusions (31) the particles deflect over their sloped surface to concentrate in the serrated grooves (31b) and the interstices area (41). The height (1111) of the serrations (31a) is sufficient to hold the concentrated particles in the first light state. It is dependent on the volume needed by the particles (10) to concentrate, and in turn is dependent on the particle loading in the ink's suspending fluid (71). The latter determines the light transmission in the dark state (i.e. the second light state). The second light state (i.e., shown in FIG. 1b) forms when the polarity of the voltage is reversed, attracting the charged particles (10) to the inner face of the second substrate (141) where they spread adjacent its electrode (60). The spreading particles are drawn to the peak of the protrusions (31) by the strength of the electrical field locally. The forming of light states in an electrophoretic device using protrusions is described in more detail in the applicant's U.S. Pat. No. 10,067,398 titled "An Electrophoretic Device Having a Transparent Light State". It is understood that the charged particles (10) may be driven with time varying voltages, e.g., waveforms, which may range in voltage from 0 to ±500V, although typically less.

In embodiment 201 the average light transmission in the serrated edge area of an aperture per unit of area is about 50% of the average transmission of the broad central aperture area (corresponding to dimension 1040). In some embodiments instead of a linear tapering of the sawtooth structure, the serrations (e.g., 31a) have curvature; for example, some embodiments have convex or concave serrations (see FIGS. 6a and 6b), and others are described by a sine function, or a Gaussian function, and provide non-linear but continuous variation in light transmission. In yet other embodiments, the serrations have one or more steps such as truncated tips, and/or stepped sides (i.e. the profile of a stairs). In yet other embodiments the light transmission gradient in the peripheral aperture area (or edge area) is created by concentrating particles (10) in micro pits (defined by microgrooves) and analogous to halftone print in appearance. In still further embodiments, the peripheral area consists of one or more stepped borders (or annulus) and light transmission changes step wise between stepped areas. In this case the different steps are associated with a different depth of concentrated particles and so a different light transmission. See, for example, FIGS. 7a and 7b.

In the peripheral area of apertures and/or obstructions defined by the apodization technique described herein, the average visible light transmission lies in the range from 75% to 25% of the transmission in the broad central (or unencumbered) area per unit of area, and preferably in the range 60% to 40%, and most preferably, 55% to 45%. In embodiments having obstructions, the unencumbered area corresponds to the broad area between obstructions (i.e. outside the obstruction diameter corresponding to dimension 1421 in FIG. 4a).

In the first light state, to minimize the peak light intensity in the diffraction bands of light transmitted through the serrated apertures of embodiments (or about serrated obstructions) the following formulas/relationships are used as a guide. The optimum values can be arrived at through trials of the range of values. The range shown is for practical implementation purposes.

The number of serrations is from 20 to 500, and preferably from 40 to 250, and most preferably from 55 to 180.

The serration pitch=protrusion circumference (e.g., defined w.r.t. width 1122 in embodiment 201) divided by the number of serrations. In embodiments where concentrated particles form obstructions (see embodiment 204 in FIG. 4b) use the obstruction outer circumference (defined w.r.t. diameter 1421 in FIG. 4a).

In embodiment 201 the serration length (1122)=width of the protrusion (i.e. outer dimension 1121) divided by n; the range for n is from 2 to 32, and preferably from 4 to 25, and most preferably from 6 to 20. In embodiments with obstructions, use the obstruction's outer diameter (see 1421 in FIG. 4a).

In an example of an embodiment having hexagonal protrusions (201), the number of serrations selected is 144 and integer n is 8. Consequently, the serration length (1122) is the hexagonal protrusion's flat-to-flat width (1121) divided by n=8. In one example, the flat-to-flat width (of the hexagonal protrusion) is 300 microns resulting in a circumscribed radius of 173.205 microns, a circumference of 1039.23 microns, a serration pitch=1039.23/144=7.217 microns, and a serration length=300/8=37.5 microns.

In an example of an embodiment having circular protrusions (203), the number of serrations selected is 72 and the integer n used to calculate the serration length (1322) is 6. In one example, the outer diameter (of the circular protrusion) is 600 microns resulting in a circumference of 1884.96 microns, a serration pitch=1884.96/72=26.18 microns, and a serration length=600/6=100 microns.

In the first light state, light transmitted by device 201 is apodized (i.e. optically transformed by apodization). By comparing the light states of FIGS. 1b and 1c, it is evident that embodiment 201 has electrically switchable apodization—the serrated sawtooth aperture edge (and the apertures) are absent in the second light state and present in the first light state.

The aperture apodization in the first light state of embodiments that results from the transmission gradient along the length of tapered serrations formed by concentrated charged particles, is analogous to the patterned, serrated aperture apodization in high power lasers where it is used to suppress Fresnel (i.e. near-field) diffraction. In high power laser systems the serrated aperture is constructed using patterning techniques such as laser ablation or photolithography to create the fixture (i.e. aperture stop) for a lens. A reference technical article that describes how Fresnel diffraction is suppressed is "Serrated-aperture apodizers for high-energy laser systems," Jerome M. Auerbach and Victor P. Karpenko, Applied Optics Vol. 33, Issue 15, pp. 3179-3183, (1994). The prior art is silent w.r.t. using patterned, serrated-aperture apodization to suppress Fraunhofer (i.e. far-field) diffraction.

FIGS. 2a and 2b show one of a plurality of hexagonal cavities (52) in the electro-optical layer of embodiment 202. Such cavities can be formed by embossing or photolithography, however embossing is preferred. The embossed polymer structure (22) on the first substrate 102 is shown in FIG. 2a and comprises the hexagonal wall (52), the serrated protrusion (32), and the interstices area (42). The magnified view (1004) shows a vertex of the serrated protrusion (32). The tapered serrations (32a) define tapered grooves (32b). The grooves (32b) differ from FIG. 1a's grooves (31b) in that their depth (dimension 1211) is less than the height of the serrations (dimension 1212), whereas in FIG. 1a both are the same. The base of the groves (32b) is sloped in some embodiments.

The serration (or groove) pitch is shown by dimension 1235, the serration (or groove) orthogonal length by dimension 1222, the flat-to-flat distance of the protrusion (32) by dimension 1221, and the distance between serrations on opposing sides, by dimension 1220. The latter is equal to dimension 1221 minus twice the serration length (i.e. 2× dimension 1222). The embossed polymer (22) on the first substrate 102 is optically transparent.

In some embodiments, in a subsequent processing step, the top (and optionally the sides) of walls 52 (of embossed polymer 22) are turned black (or a color matching the charged particles) by coating with a colored adhesive. In some of these embodiments, the adhesive is cured prior to assembling the device with ink, and in other embodiments the adhesive is cured immediately after assembling. In the latter case, the adhesive seals the cavities by bonding the tops of wall (52) to the inner face of the second substrate.

FIG. 2b shows a face view of embodiment 202 in the first light state. The concentrated particles (10) fill the tapered grooves (32b) and the interstices area (42) between the protrusion serrations (32a) and the hexagonal cavity wall 52. The latter is shown transparent, but preferably, it is colored and matches the color of the charged particles. The volume required to concentrate the charged particles (10) of the electrophoretic ink (71) is selected to adequately fill the taped grooves (32b) up to the level indicated by dimension 1212 plus dimension 1211.

Light transmission varies linearly in the tapered serrated aperture edge area from a maximum at the inside tips of the serrations (indicated by dimension 1240) to a minimum at the outer edges of the serration area (indicated by dimension 1241). Dimensions 1240 and 1241 relate to the aperture (32c) and its sawtooth peripheral structure formed by the concentrated particles (10). The dimensions are defined by the protrusion dimensions 1220 and 1221 respectively (shown in FIG. 2a).

Two section views are provided in FIGS. 2c and 2d as taken at line A-A, as shown in FIG. 2b. It is understood that the dimensions of FIGS. 2c and 2d are not related to FIG. 2b, but rather illustrative of the structures and their function. FIG. 2c represents the second "closed" state wherein the particles (10) are distributed through the fluid (71) to absorb light that is passing through the electrophoretic medium (273). As discussed with respect to FIG. 2b, the walls 52 are preferably darkened, and the raised structure (32) includes tapered groves (32b) between serrations (32a) leading to the interstices area (42). When the polarity of the electric field between the electrodes (260) is reversed, the charged particles are attracted to the first substrate (290) (i.e. the bottom surface) as shown in FIG. 2d to form the first "open" light state. The charged particles pack in the capture volume between the serrations (32a) of the apodization structure in addition to packing in the interstices area (42). FIG. 2d is a cross-sectional representation of the face view shown in FIG. 2b. Because the walls (52) are colored dark, the face or view of the open state (as shown in FIG. 2b) looks quite similar to FIG. 1c, as discussed above. Additionally, it is to be understood that one or more layers of adhesive (265), such as an optically-clear adhesive, such as available from Norland, may be used to bond various films and structures to one another as shown in FIG. 2c.

FIGS. 3a and 3b show one of a plurality of hexagonal cavities (53) in the electro-optical layer of embodiment 203. The embossed polymer structure (23) on the first substrate 103 is shown in FIG. 3a and comprises the hexagonal wall (53), the serrated protrusion (33), and the interstices area (43). The magnified view (1005) shows a segment of the serrated protrusion (33). The tapered serrations (33a) define tapered grooves (33b). The protrusion (33) is circular and its tapered serrations (33a) and groves (33b) are arranged radially. In some embodiments, the serrations can be arranged obliquely (i.e. at an acute angle to the radial).

The inner surface of the tapered serrations (33a) is parallel to their base and the electrode face. There is a step change in height (shown by dimension 1315) between the protrusion surface inside the serrated area, and the inner surface of the serrations. In some embodiments, the protrusion surface inside the serrated area follows the slope of a cone, in others it is a flat top, and in yet others it is in the shape of stepped annuli.

The serration (or groove) pitch is shown by dimension 1335, the serration (or groove) radial length by dimension 1322, the circumscribed diameter of the protrusion (33) by dimension 1321, and the inscribed diameter, by dimension 1320. The latter is equal to dimension 1321 minus twice the serration length (i.e. 2× dimension 1322). The non-planar polymer (23) on the first substrate 103 is optically transparent.

FIG. 3b shows a face view of embodiment 203 in the first light state. The concentrated particles (10) fill the tapered grooves (33b) and the interstices area (43) between the protrusion serrations (33a) and the hexagonal cavity wall 53. The volume required to concentrate the charged particles (10) of the electrophoretic ink (71) is selected to adequately fill the taped grooves (33b) up to the level shown by dimension 1311.

In some embodiments the circumscribed aperture diameter (defined by protrusion diameter 1321) is the same as the flat-to-flat width of the hexagonal wall cavity and so the interstices area (43) is discontinuous.

In some embodiments, there is no interstices area within a cavity with the result that the tip of serrations join the inner cavity wall. In these embodiments the serration tip can be truncated so that at the wall join the serration tip is 1-2 microns across (as opposed to a point contact). The charged particles (10) concentrate in the serration groves only in the first light state (i.e. such embodiments lack an interstices area and protrusions abut each other or a wall structure). For example, an embodiment of this type and having circular protrusions, then the space between the hexagonally-packed, serrated, circular protrusions is wall structure and the inner wall of cavities is circular.

In embodiment 203, light transmission varies linearly in the tapered serrated aperture edge area from a maximum at the inside tips of the serrations (indicated by dimension 1340) to a minimum at the outer edges of the serration area. Dimension 1340 relates to the aperture (33c) and its sawtooth peripheral structure formed by the concentrated particles (10). The aperture dimensions are defined by the protrusion dimensions 1320 and 1321 (shown in FIG. 3 a).

FIGS. 4a and 4b show one of a plurality of hexagonal cavities (54) in the electro-optical layer of embodiment 204. The embossed polymer structure (24) on the first substrate 104 is shown in FIG. 4a and comprises the hexagonal wall (54), the serrated wells (44), and the raised dielectric area (34). The magnified view (1006) shows a segment of the serrated well (44). The tapered radial serrations (34a) define tapered grooves (34b). The wells (44) are circular and their tapered serrations (34a) and groves (34b) are arranged radially.

The serration (or groove) pitch is shown by dimension 1435, the serration (or groove) radial length by dimension 1422, the outer diameter of a well (44) by dimension 1421, and the inside diameter, by dimension 1420. The latter is equal to dimension 1421 minus twice the serration length (i.e. 2× dimension 1422). The non-planar polymer (24) on the first substrate 104 is optically transparent.

FIG. 4b shows a face view of embodiment 204 in the first light state. Concentrated particles 11 are driven by the applied electrical field to concentrate in wells 44. The latter form optical obstructions (44a) about which light diffracts. Diffraction is suppressed by filling the tapered grooves (34b) with concentrated particles (11). The volume required to concentrate the charged particles (11) of the electrophoretic ink (72) is selected to adequately fill the taped grooves (34b) up to the level of their height (see dimension 1411).

In embodiment 204, light transmission varies linearly in the tapered serrated obstruction edge area from a minimum at the inside tips of the serrations (indicated by well dimension 1420) to a maximum at the outer edges of the serration area (indicated by well dimension 1421).

The embodiments in the figures described periodic serrations, but in other embodiments, the serrations in an aperture (or an obstruction) have differences including one or more of: different serration lengths in the same aperture, different serration orientations in the same aperture (e.g. orthogonal serrations mixed with radial serrations in a polygonal aperture), different serration pitches in the same aperture, and different shape of serrations in the same aperture. In yet other embodiments, these serration differences are not within an aperture (or obstruction) but between numerous apertures (or obstructions) in the device.

Alternative constructions of apodization structures, including a plurality of protrusions are shown in FIGS. 5a, 5b, 6a, 6b, 7a, and 7b. FIG. 5a exemplifies a plurality of rectangular serrations (56a) that result in a series of slots (56b) leading to an interstices area (57) adjacent the circumference of the wall (58) of an electrophoretic cell. The slots (56b) may drop off as steps, or the slots (56b) may be tapered, concave, or convex as they transition to the interstices area (57). As shown in FIG. 5a, the cell has a width (W), representing a longest interior dimension that may be between 50 microns and 5,000 microns. The width of the walls (58) may be from 7.5 microns to 175 microns, more preferably, from 12 microns to 125 microns, and most preferably, from 15 microns to 90 microns. The height (or depth) orthogonal to the second substrate's face at the interstices area (57) is from 3% to 99% of the cell width (W), more preferable, from 5% to 66%, and most preferably, from 6.25% to 46%, while the height from the extend of the raised feature (56) is smaller than at the interstices height (57), for example, from 1% to 60% of the cell width.

Figure 6B:
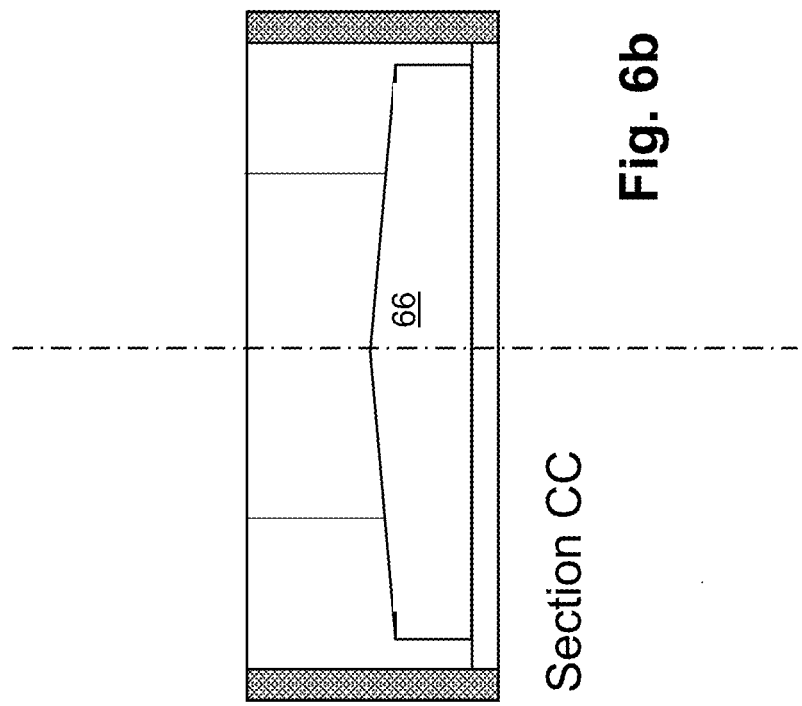
FIG. 6b shows a side section view of an alternative apodization structure that may be used with the invention.
Figure 6A:
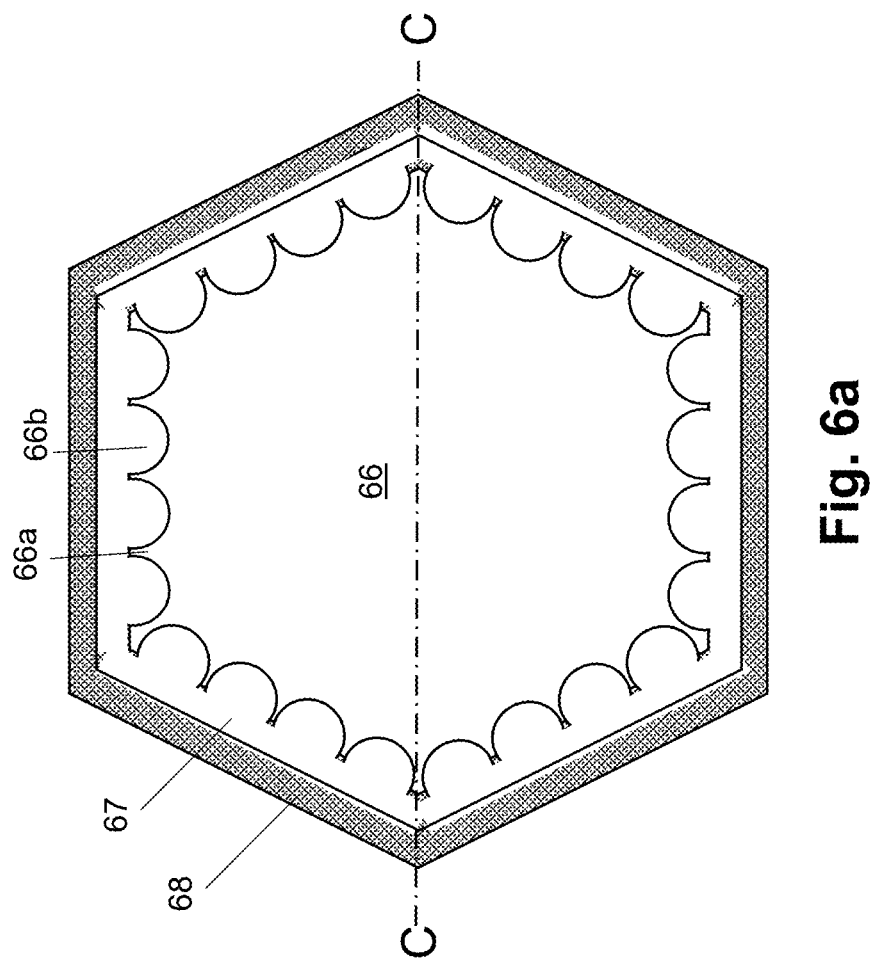
FIG. 6a shows a face view of an alternative apodization structure that may be used with the invention.
Figure 7B:
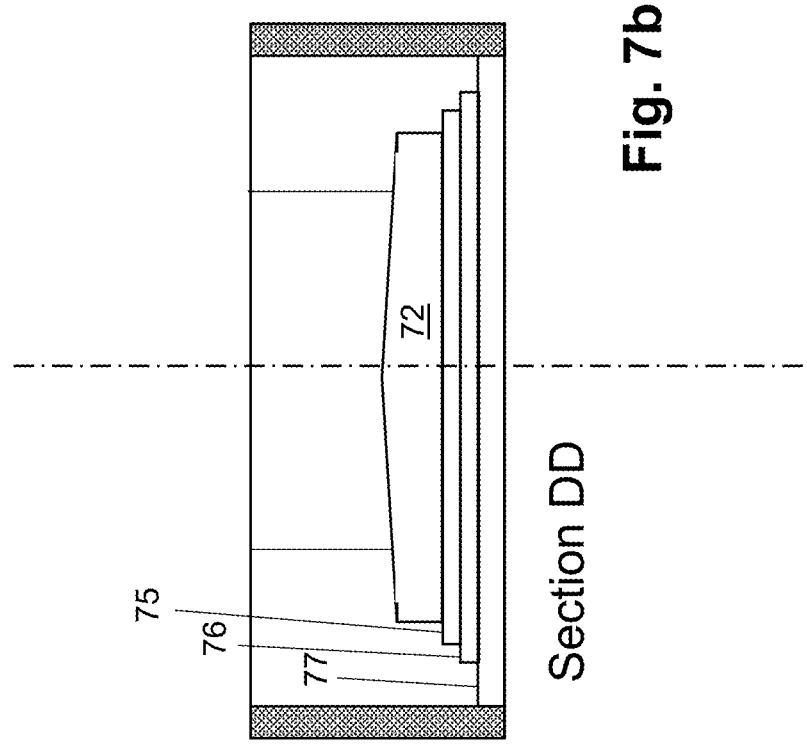
FIG. 7b shows a side section view of an alternative apodization structure that may be used with the invention.
Figure 7A:
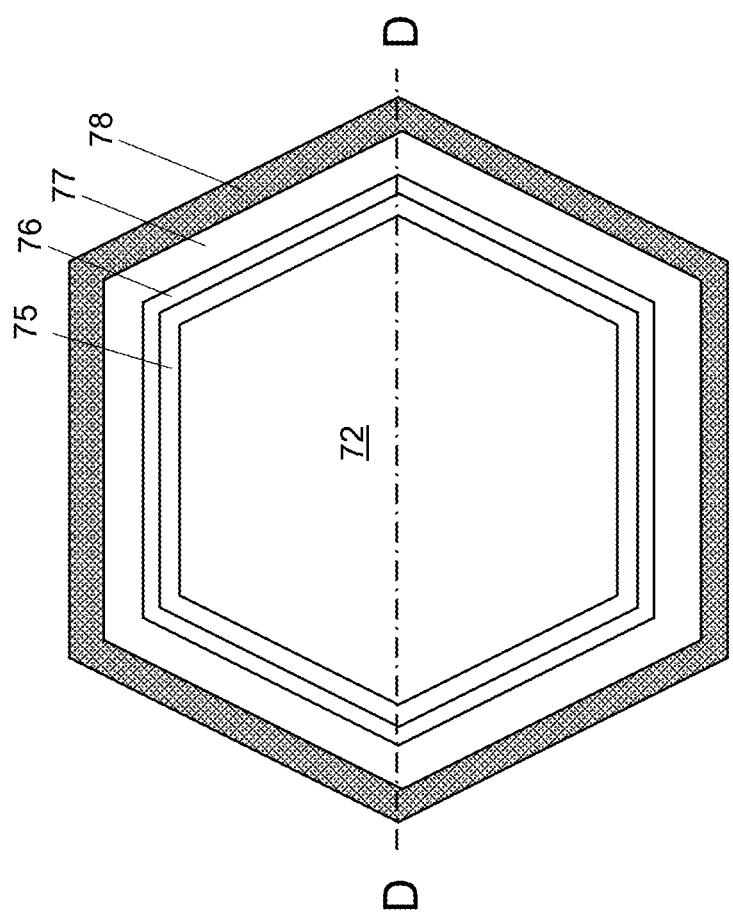
FIG. 7a shows a face view of an alternative apodization structure that may be used with the invention.

Clearly, alternative geometries are feasible, such as scalloped capture volumes (66b) formed by serrations (66a) as shown in FIGS. 6a and 6b. In the latter, the interstices area is indicated by 67, and the cell wall, by 68. Additionally, as discussed above, the apodization structure may include a plurality of steps (75, 76) leading to an interstices area (77) as shown in FIGS. 7a and 7b. With proper index matching of the polymer material and the proper loading of charged particles, each step can be configured to produce, for example, a ⅕ reduction in optical density (i.e. masking) as compared to the preceding annular ring closer to the wall (78). In this way the step reduction in light transmission corresponding to the annular rings approximates a Gaussian transmission profile even though only two or more steps (i.e. annular rings) are used.

Some embodiments provide a third light state in which apertures and/or obstructions are selected to be 'not-apodized'. This third light state maximizes the transmission of light, transmitting more light than in the first light state. In the third light state, the concentrated particles are selectively driven into the interstices area and vacate the serrated grooves. Such embodiments provide a sharp transition between light transmitting and light obstructing at aperture (or obstruction) edges in the third light state.

Wikipedia provides a description of "diffraction" and "apodization". As used herein, diffraction refers to various phenomena arising from the wave nature of light. It describes the apparent bending of light waves around an obstruction and the spreading out of light waves past apertures. Many of the applications contemplated herein, such as variable light transmittance films for use in windows, are viewed from a distance of one metre or more, and the scene visible through an embodiment will be at a distance of 10 meters or more, typically. In such cases the diffraction pattern (where present) is known as Fraunhofer diffraction (i.e. far field conditions). If the object and viewing distances are less than one metre then the pattern (where present) can fulfil the conditions for Fresnel diffraction (i.e. near-field diffraction), see the relevant entries in www.wikipedia.org for example. The condition for Fraunhofer diffraction is dependent on the major axis of an aperture (or obstruction), the viewing distance needs to be far greater than the major axis (for more information see the "Fraunhofer Diffraction" entry in www.wikipedia.org).

In general, diffraction in embodiments is in relation to visible light, even though devices described minimize diffraction of light across the sunlight spectrum including the infrared. Diffraction occurs in embodiments at the edge of light transmitting and obstructing areas, or, at the edge between two transparent area having different refractive indices (i.e., light traveling at different speeds). The obstruction of light can be caused by concentrated charged particles substantially absorbing it, or concentrated charged particles causing a change in refractive index as well as light attenuation. In other embodiments, the obstruction of light by concentrated charged particles includes by diffuse or specular reflection.

In embodiments, a diffraction pattern of varying intensity may still be perceivable depending on light conditions, but the maximum intensity amplitude of the maxima in the diffraction pattern will be less than half the corresponding non-apodized device for the 4th and higher order band maxima shown by a PSF plot of intensity versus distance (or viewing angle). In some embodiments, the suppression of diffraction in the higher order maxima (≥4th) is from 3 to 10 fold and diffraction pattern band/ring 5 and higher are not perceivable when viewing a bright light through an embodiment under far field conditions. In some embodiments the numerous apertures (and/or obstructions) in the first light state are aperiodic (i.e. not periodically spaced) or random across a viewing face. In prior art devices having a hard transition/edge, a complex bright halo results about brightly lit objects viewed through randomized apertures. In embodiments having randomized, apodized apertures, a halo may still be perceivable depending on light conditions, but its relative intensity (relative to the central or Airy disc) will be noticeably less.

Embodiments of the device regulate light transmission and/or visual access when incorporated into a window of a building, including single, double, and triple glazed windows. In the latter two, the device is preferably located in a pane adjacent the outside environment so that absorbed sunlight energy can be dissipated by convection and thermal radiation to the outside environment. In other window and/or opening embodiments, the device regulates the transmission of sunlight into the interior of an automobile or public transport vehicle (e.g., bus, train, tram, ferry, or ship), minimizes glare, and provides a degree of privacy for occupants from outside viewers while maintaining visibility of the outside for occupants. Yet other embodiments include use as a light shutter, a light attenuator, a variable light transmittance sheet, a variable light absorptance sheet, a variable light reflectance sheet, a one-way mirror, a sunvisor, or a skylight.

In some embodiments an electrophoretic ink fills the cavities in a laminating step that applies the embossed polymer structure previously formed on (and bonded to) the first substrate, to the second substrate, with the ink layer between. Preferably, the laminating step uses a pair of NIP rollers orientated so that the substrates travel from top-to-bottom (as opposed to left-to-right) between the rollers. The fluid is in a bead between the substrates above the NIP point and laminated by the rollers into the cavities in the embossed polymer as the substrates pass the NIP point. The orthogonal distance between the parallel faces of the substrates is determined by the polymer wall structures as the substrates pass the NIP point. Preferably, the tops of the polymer wall are bonded to the second substrate in a UV light (or other radiation) cure stage after or contemporaneously with laminating.

In some embodiments, the device has flexible film substrates and is sufficiently flexible to be compatible with roll-to-roll manufacture. The film device has significant structural strength and compartmentalizes the fluid layer in cavities with each cavity holding a discrete ink volume that is self-sealed and isolated from adjacent cavities. The structural strength of embodiments derives from the selection of its polymer structure and polymer sealing materials. The structural strength includes that necessary to withstand being permanently laminated to glass panes in a laminated safety glass comprising either EVA or PVB interlayers as optical adhesive between the device and glass panes. The device's materials are selected to have resistance to mechanical shocks and environmental extremes (sunlight and outdoor temperature) in normal use.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. An electrophoretic cell comprising:
   a light transmissive substrate;
   a first, light-transmissive electrode layer adjacent the light transmissive substrate;
   a cell having walls and a bottom including a light transmissive apodization structure, the walls and bottom creating a volume;
   a second electrode layer, wherein the cell is disposed between the first, light-transmissive electrode layer and the second electrode layer;
   an electrophoretic medium including a solvent and a first set of charged pigment particles disposed in the volume of the cell; and
   a bottom substrate, wherein the apodization structure comprises a plurality of serrations, and grooves there between, that define a plurality of capture volumes for the charged pigment particles.

2. The electrophoretic cell of claim 1, further comprising an optically clear adhesive layer.

3. The electrophoretic cell of claim 1, wherein the first set of charged pigment particles are black.

4. Electrophoretic cell of claim 1, wherein the bottom of the cell is light-transmissive.

5. The electrophoretic cell of claim 4, wherein the second electrode layer is light-transmissive.

6. The electrophoretic cell of claim 1, wherein the walls are substantially light absorbing.

7. The electrophoretic cell of claim 1, wherein the apodization structure defines a peripheral area of a cavity.

8. The electrophoretic cell of claim 7, wherein the apodization structure contacts a wall of the cell.

9. The electrophoretic cell of claim 1, wherein the plurality of serrations and grooves are tapered.

10. The electrophoretic cell of claim 1, wherein the plurality of serrations form serrated edges adjacent to protrusions or wells and have the appearance of saw teeth.

11. The electrophoretic cell of claim 10 wherein the protrusions or wells have curvature and the serrations are arranged radially.

12. The electrophoretic cell of claim 1, wherein the length of the serrations (in a plane parallel to the light transmissive substrate) is proportional to the width of the apodization structure, and the length of the serrations is between from $\frac{1}{2}$ to $\frac{1}{32}$ of the width of the apodization structure.

13. The electrophoretic cell of claim 12, wherein the length of the serrations is between from $\frac{1}{4}$ to $\frac{1}{25}$ of the width of the apodization structure.

14. The electrophoretic cell of claim 13, wherein the length of the serrations is between from $\frac{1}{6}$ to $\frac{1}{20}$ of the width of the apodization structure.

15. The electrophoretic cell of claim 1, wherein the apodization structure includes between 20 and 500 serrations.

16. The electrophoretic cell of claim 15, wherein the apodization structure includes between from 40 to 250 serrations.

17. The electrophoretic cell of claim 16, wherein the apodization structure includes between from 55 to 180 serrations.

18. The electrophoretic cell of claim 1, wherein the grooves are polygonal and tapered.

19. The electrophoretic cell of claim 1, wherein the cell is between 5 μm and 5000 μm in height.

20. The electrophoretic cell of claim 1, wherein the bottom of the cell is peaked so that the distance between the bottom and the first light-transmissive electrode layer in the middle of the cell is smaller than the distance between the bottom and the first light-transmissive electrode layer at an edge between the wall and the bottom of the cell.

21. A light shutter, a light attenuator, a variable light transmittance sheet, a variable light absorptance sheet, a variable light reflectance sheet, a one-way mirror, a sunvisor, a skylight, a display, or a digital sign including the electrophoretic cell of claim 1.

22. An electrophoretic cell comprising:
a light transmissive substrate;
a first, light-transmissive electrode layer adjacent the light transmissive substrate;
a cell having walls and a bottom including a light transmissive apodization structure, the walls and bottom creating a volume;
a second electrode layer, wherein the cell is disposed between the first, light-transmissive electrode layer and the second electrode layer;
an electrophoretic medium including a solvent and a first set of charged pigment particles disposed in the volume of the cell; and
a bottom substrate, wherein the apodization structure comprises a plurality of floor thicknesses that define different optical densities when the charged pigment particles are attracted to the bottom electrode layer.

23. The electrophoretic cell of claim 22, wherein the first set of charged pigment particles are black.

24. Electrophoretic cell of claim 22, wherein the bottom of the cell is light-transmissive.

* * * * *